US011593054B2

(12) United States Patent
Chen et al.

(10) Patent No.: US 11,593,054 B2
(45) Date of Patent: Feb. 28, 2023

(54) DISPLAY CONTROL METHOD AND COMPUTER-READABLE RECORDING MEDIUM RECORDING DISPLAY CONTROL PROGRAM

(71) Applicant: FUJITSU LIMITED, Kawasaki (JP)

(72) Inventors: Bin Chen, Machida (JP); Keiju Okabayashi, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 17/005,665

(22) Filed: Aug. 28, 2020

(65) Prior Publication Data

US 2021/0072948 A1     Mar. 11, 2021

(30) Foreign Application Priority Data

Sep. 5, 2019  (JP) .............................. JP2019-162192

(51) Int. Cl.
*G06F 3/14*       (2006.01)
*G06F 3/0346*     (2013.01)
*G06F 3/04883*    (2022.01)
*G06F 3/147*      (2006.01)

(52) U.S. Cl.
CPC .......... *G06F 3/1454* (2013.01); *G06F 3/0346* (2013.01); *G06F 3/04883* (2013.01); *G06F 3/147* (2013.01)

(58) Field of Classification Search
CPC .. G06F 3/1454; G06F 3/0346; G06F 3/04883; G06F 3/147
See application file for complete search history.

(56) References Cited

U.S. PATENT DOCUMENTS

| 8,910,309 | B2 * | 12/2014 | Harrison | .......... H04N 21/41415 |
| | | | | 726/30 |
| 10,135,964 | B2 * | 11/2018 | Nuescheler | ......... G06F 3/03547 |
| 10,168,980 | B2 * | 1/2019 | Sakai | .................. H04L 67/1095 |
| 2007/0106942 | A1 * | 5/2007 | Sanaka | ............... G06F 3/04886 |
| | | | | 715/733 |
| 2010/0011301 | A1 * | 1/2010 | Binyamin | ............... H04L 65/60 |
| | | | | 715/748 |

(Continued)

FOREIGN PATENT DOCUMENTS

| EP | 3232356 | 10/2017 |
| JP | 2010-165220 A | 7/2010 |

(Continued)

OTHER PUBLICATIONS

Extended European Search Report dated Jan. 28, 2021 for corresponding European Patent Application No. 20192836.3, 9 pages.

*Primary Examiner* — Jeremy L Stanley
(74) *Attorney, Agent, or Firm* — Fujitsu Patent Center

(57) ABSTRACT

A display control method includes: determining, by a computer, a link between an operation target object to be displayed on a display and a terminal that is to output the operation target object; and when detecting specific operations of outputting the operation target object from a plurality of terminals within a certain period of time after detecting a predetermined display operation for displaying the operation target object on the display, providing a guide giving a prompt to perform the specific operation again.

5 Claims, 33 Drawing Sheets

(56) References Cited

U.S. PATENT DOCUMENTS

| | | | |
|---|---|---|---|
| 2010/0149090 A1* | 6/2010 | Morris | H04L 67/42 345/156 |
| 2010/0262673 A1* | 10/2010 | Chang | G09G 5/14 709/217 |
| 2012/0054640 A1* | 3/2012 | Nancke-Krogh | G06F 3/1454 715/751 |
| 2012/0204116 A1* | 8/2012 | Patil | G06F 9/451 715/753 |
| 2013/0073980 A1* | 3/2013 | Amendolagine | G06F 3/04847 715/751 |
| 2013/0210488 A1* | 8/2013 | Lee | H04N 21/42224 455/557 |
| 2014/0282068 A1* | 9/2014 | Levkovitz | H04L 67/10 715/748 |
| 2014/0282229 A1* | 9/2014 | Laukkanen | G06F 3/04842 715/788 |
| 2015/0088799 A1 | 3/2015 | Zhou et al. | |
| 2015/0106740 A1* | 4/2015 | Tan | G06F 3/0481 715/750 |
| 2015/0181634 A1* | 6/2015 | Cheng | H04W 4/026 455/426.1 |
| 2016/0267287 A1* | 9/2016 | Kobayashi | G06F 21/83 |
| 2016/0283102 A1* | 9/2016 | Chen | G06F 9/452 |
| 2016/0291804 A1* | 10/2016 | Okabayashi | G06F 3/04883 |
| 2017/0192663 A1* | 7/2017 | Yang | G06F 3/04883 |
| 2018/0074594 A1* | 3/2018 | Herz | G06F 3/017 |
| 2018/0074779 A1* | 3/2018 | Marquardt | G06F 3/1454 |
| 2019/0286245 A1* | 9/2019 | Ikeda | G06F 3/0484 |
| 2020/0389508 A1* | 12/2020 | Hashimoto | H04L 65/4015 |

FOREIGN PATENT DOCUMENTS

| | | |
|---|---|---|
| JP | 2015-064715 A | 4/2015 |
| JP | 2016-186734 A | 10/2016 |

\* cited by examiner

FIG. 9

|  | TERMINAL A | TERMINAL B | TERMINAL C |
|---|---|---|---|
| DISPLAY FRAME 1 | p(1,A) | p(1,B) | p(1,C) |
| DISPLAY FRAME 2 | p(2,A) | p(2,B) | p(2,C) |

FIG. 10A 323,341

| NUMBER | TERMINAL ID (IMEI) | TIME |
|---|---|---|
| 1 | | |
| ... | | |

FIG. 10B 312,342

| NUMBER | FRAME ID | TIME | POSITION (x, y) |
|---|---|---|---|
| 1 | | | |
| ... | | | |

FIG. 10C 343,344

| NUMBER | COMMAND | FRAME ID | TIME | POSITION (x, y) |
|---|---|---|---|---|
| 1 | DISPLAY | | | |
| ... | DELETE | | | |

FIG. 10D

| CANDIDATE PAIR NUMBER | FRAME INDEX | TERMINAL INDEX | FRAME ID | TERMINAL ID | TIMER TIME | ASSOCIATION PROBABILITY $p(i, j)$ | FRAME POSITION $(x, y)$ |
|---|---|---|---|---|---|---|---|
| 1 | | | | | | | |
| 2 | | | | | | | |
| ⋮ | | | | | | | |

|     | i=0      | i=1      | i=2      |
|-----|----------|----------|----------|
| k=0 | p(0,0,t) | p(1,0,t) | p(2,0,t) |
| k=1 | p(0,1,t) | p(1,1,t) | p(2,1,t) |

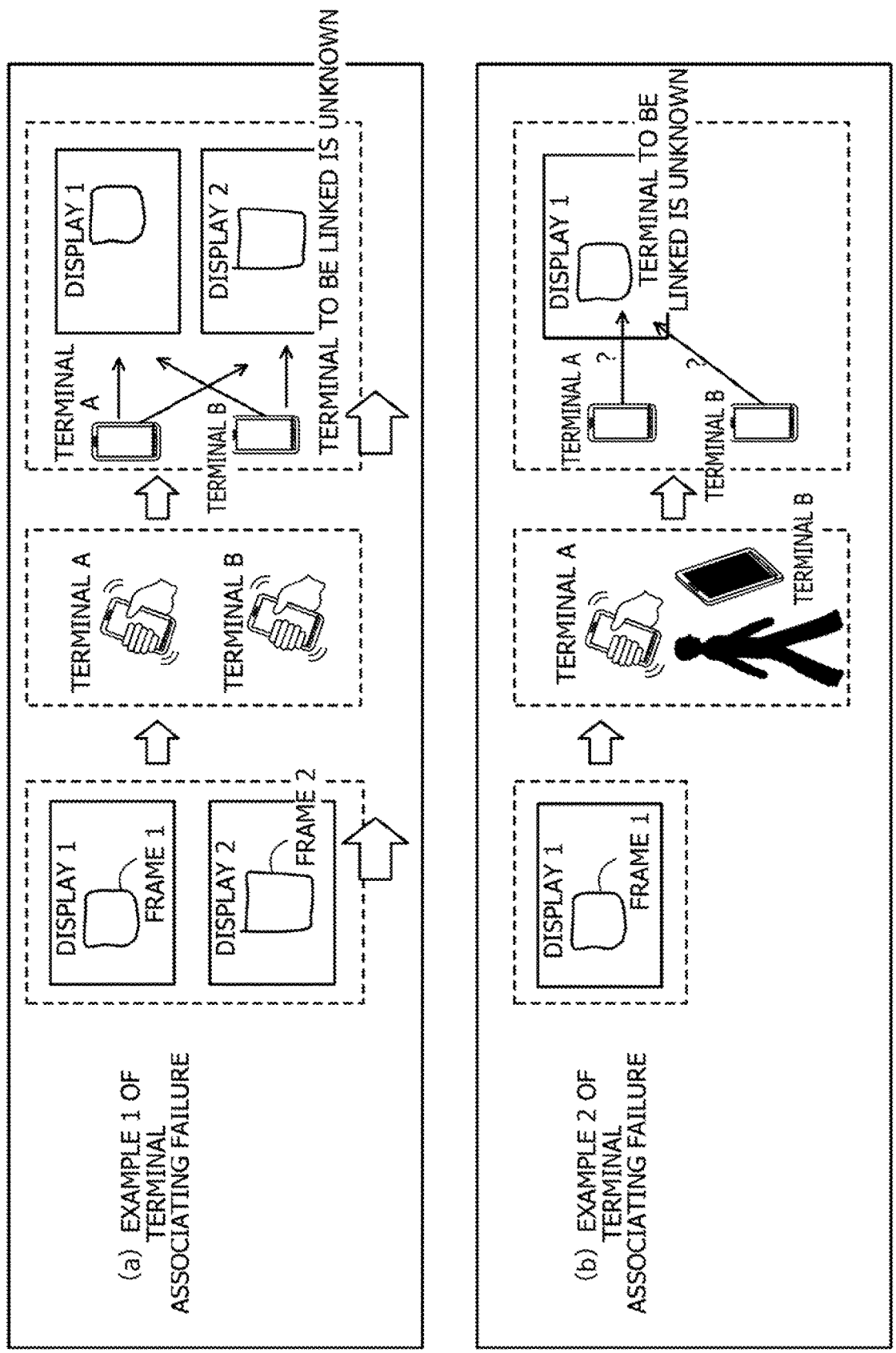

DISPLAY CONTROL METHOD AND COMPUTER-READABLE RECORDING MEDIUM RECORDING DISPLAY CONTROL PROGRAM

CROSS-REFERENCE TO RELATED APPLICATION

This application is based upon and claims the benefit of priority of the prior Japanese Patent Application No. 2019-162192, filed on Sep. 5, 2019, the entire contents of which are incorporated herein by reference.

FIELD

The embodiments discussed herein are related to a display control method, a display control program, and an information processing apparatus for linking screens of multiple devices with each other.

BACKGROUND

There has been proposed a collaboration system in which a display for projection display or the like is arranged on a wall, a table, or the like in a room such as a meeting room, and the displays of mobile terminals of multiple users participating in a meeting are linked with presentations on the display. A spatial user interface (UI) is a technique for digitally supporting meeting participation of multiple users.

Related art is disclosed in Japanese Laid-open Patent Publication No. 2016-186734, Japanese Laid-open Patent Publication No. 2010-165220 and Japanese Laid-open Patent Publication No. 2015-64715.

SUMMARY

According to an aspect of the embodiments, a display control method includes: determining, by a computer, a link between an operation target object to be displayed on a display and a terminal that is to output the operation target object; and when detecting specific operations of outputting the operation target object from a plurality of terminals within a certain period of time after detecting a predetermined display operation for displaying the operation target object on the display, providing a guide giving a prompt to perform the specific operation again.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a table for explaining association probabilities between multiple display frames and multiple terminals by the information processing apparatus according to the embodiment.

FIG. 10A is a table illustrating an example of data handled by the information processing apparatus according to the embodiment (part 1).

FIG. 10B is a table illustrating an example of data handled by the information processing apparatus according to the embodiment (part 2).

FIG. 10C is a table illustrating an example of data handled by the information processing apparatus according to the embodiment (part 3).

FIG. 10D is a table illustrating an example of data handled by the information processing apparatus according to the embodiment (part 4).

FIG. 14B is a table illustrating an example of association probabilities that the information processing apparatus according to the embodiment refers to when determining an association.

FIG. 29 is a diagram illustrating problems concerning linking of a display frame with a terminal according to the related art.

DESCRIPTION OF EMBODIMENTS

Figure 1:
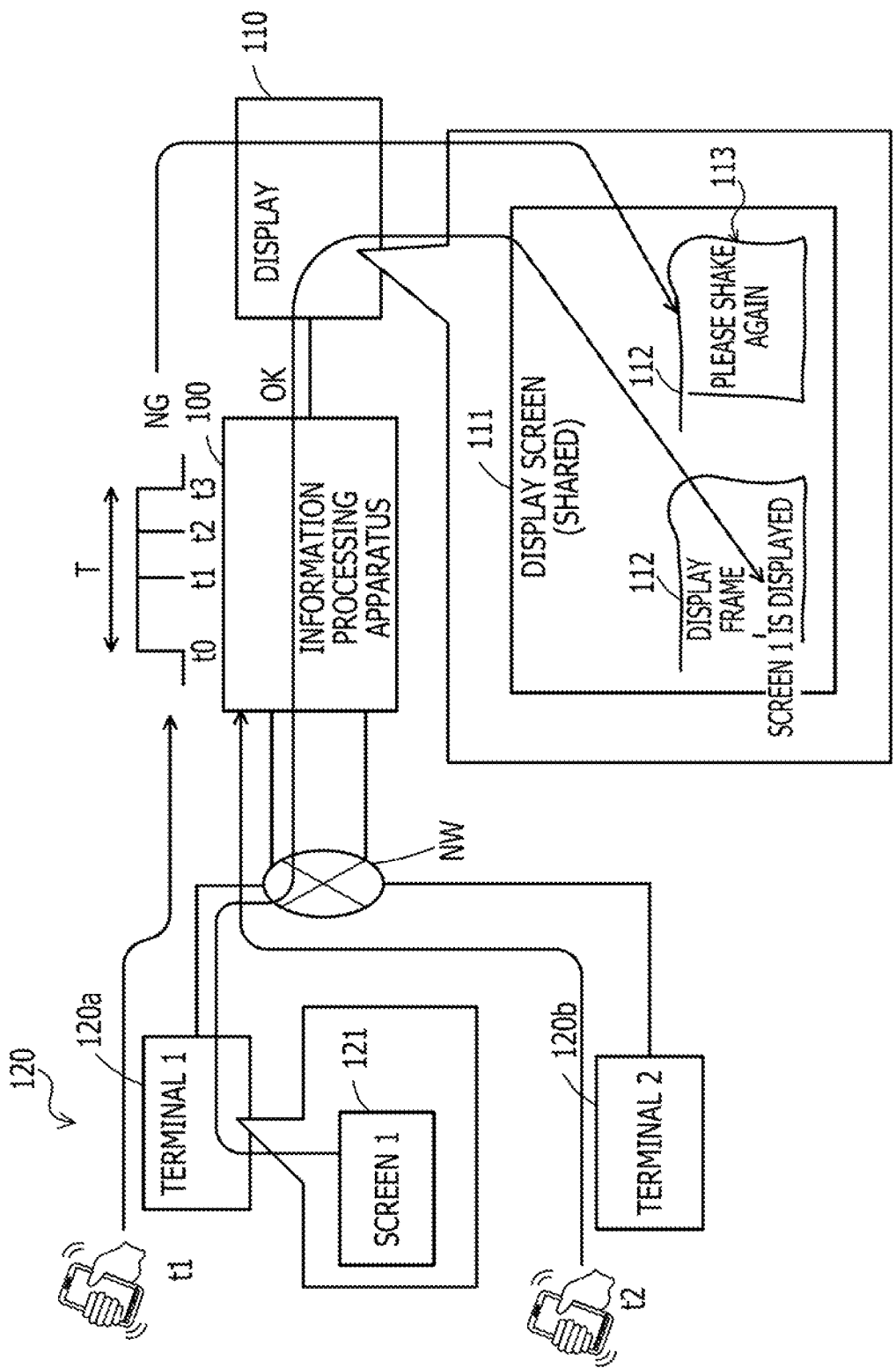
FIG. 1 is a diagram for explaining display screen linking processing between devices by an information processing apparatus according to an embodiment.

As the spatial UI technique, for example, a technique has been proposed in which devices such as a projector, a touch panel, and a camera installed in a room are coupled with each other to make the whole room be user interfaces (UI). For example, since the display screen of a mobile terminal such as a smartphone is small in size, the display screen may be shared with other users when an image of the screen of the mobile terminal is presented on a large display. Using the spatial UI, the mobile terminals of multiple users are linked with a spatial UI display and the display screens on the terminals and the display are presented in synchronization with each other, so that the users are enabled to operate the mobile terminals or use data in the mobile terminals through the screen on the spatial UI display. For example, a user is enabled to import data posted for sharing by another user into the user's mobile terminal.

Use of the spatial UI enables the following things. For example, using a card application (card app) that displays cards on a table, a user writes an idea to a card on the table. When the user flicks (moves) the card, the object written on the card is enabled to be shared with another user. Using a discussion board app that displays a digital discussion board on a table, multiple users are enabled to import an object (card) of a certain user into a display area of the digital discussion board, and share the information in the card or organize the data in the card. Depending on the purpose of use of the digital discussion board, a certain user may not import digital cards into his/her own digital discussion board. For this reason, the display screen of the digital discussion board is equipped with a button for switching a digital card import mode, and the user is allowed to manually switch the import mode.

As a technique for linking display screens of devices with each other, there is a technique of causing a designated window to display content data of a terminal associated with the window by way of a shake operation or the like of the terminal within a certain period of time. There is a technique of selecting, from input information from multiple devices, input information received at the earliest time or assigned with predetermined identification information, or selecting input information through time-sharing processing. There is a technique of selectively displaying operations executable by multiple terminals on a shared screen, the technique inputting, to a target terminal device, a display prompting an input of a candidate operation having the highest operation probability.

However, in the related art, the operation of linking the display screens of the devices with each other is complicated, and a link between the devices may not be determined in some cases. For example, the above mode switching requests a manual operation by a user, and therefore the switching operation is bothering.

For example, in the display screen linking processing between the devices in the related art, the user draws a frame where to display the screen of the mobile terminal on the display screen. After that, the linking processing is performed in which a mobile terminal shaken within a certain period of time is linked with the frame and the display screen of the mobile terminal is displayed in the frame. When multiple mobile terminals are shaken within the certain period of time, the above linking processing fails to determine a mobile terminal to be linked.

In an aspect, a link between display screens of multiple devices to be established by a simple operation may be enabled.

Embodiments

Hereinafter, embodiments of a display control method, a display control program, and an information processing apparatus disclosed herein will be described in detail with reference to the drawings.

FIG. 1 is a diagram for explaining display screen linking processing between devices by an information processing apparatus according to an embodiment. In order to cause a spatial UI display to display a screen of a terminal for users' collaborative work or the like, the information processing apparatus in the embodiment receives a specific operation (such as, for example, a shake operation of the terminal) by the user for making a screen sharing request to display the screen of the terminal on the display. Thus, the screen output by the terminal is determined as an operation target object to be displayed in the display frame on the display.

When multiple terminals are shaken within a certain period of time, the information processing apparatus fails to determine a terminal to be linked with the operation target object, and thus causes the display to display a guide giving a prompt to shake the terminal again. This may avoid a situation where the terminal to be linked with the operation target object remains undetermined (unassociated). The small screen of the terminal determined among the terminals of the multiple users is displayed on the large display, and the multiple users are enabled to perform various shared operations on the image of the terminal displayed on the display.

As illustrated in a configuration example of FIG. 1, a display 110 and terminals 120 are coupled to an information processing apparatus 100 that controls a link between display screens of devices. The display 110 is installed, for example, on a table, a wall, or the like in a room such as a classroom or a meeting room, and displays a display screen 111 that multiple users each carrying the terminal 120 share for work in a meeting or the like. The display 110 according to the embodiment is a touch panel, detects a touch operation on a display screen of the display 110, and makes output to the information processing apparatus 100.

Each of the multiple users carries the terminal 120 (120a or 120b) such as a smartphone, and is enabled to output a screen of the terminal 120 to the information processing apparatus 100 via a network NW, for example, a local network such as a wireless LAN. In response to a predetermined operation by a user, the information processing apparatus 100 controls linking processing such that a screen of the terminal 120 (a screen 1 (121) being displayed on the terminal 1 (120a) in the illustrated example) will be displayed on the display screen 111 of the display 110.

The display screen 111 is, for example, a discussion board application (discussion board app) for displaying a pseudo digital discussion board. A spatial UI system (for example, the information processing apparatus 100) executes the program of the discussion board app, and the touch panel installed on the table or the like in the meeting room displays the display screen 111 of the digital discussion board.

When the screen 1 (121) of the terminal 1 (120a) is displayed in the display screen 111 on the display 110, multiple users are enabled to see the screen 1 (121) displayed on the terminal 1 (120a) via the display screen 111 on the display 110. The multiple users are also enabled to perform an operation for data use of the terminal 1 (120a) or the like (referred to as screen sharing).

The information processing apparatus 100 performs control for screen sharing in response to a specific operation for screen sharing performed on any of the terminals 120. In the embodiment, the specific operation for screen sharing is an operation in which the user shakes the terminal 120. The terminal 120 internally includes an acceleration sensor or the like and detects a shake operation. A display application of the terminal 120 outputs, to the information processing apparatus 100 during the shake operation, a screen sharing request to cause the display 110 to display the screen (operation target object) being displayed on the terminal 120. The specific operation for screen sharing is not limited to the above-described shake operation. The terminal 120 may output a screen sharing request in response to a specific situation of the terminal 120, for example, an event in which the terminal 120 is placed with its back side facing upward on a table or the like or a specific key assigned and set in advance is operated in the terminal 120.

The information processing apparatus 100 receives, from the display 110, information specifying a screen sharing area (display frame) for the terminals 120, When a user who intends to share a screen draws a certain display frame 112 on the display screen 111 of the display 110 with a touch pen or the like, the information processing apparatus 100 detects a portion closed in a substantially rectangular shape as the display frame 112. The information processing apparatus 100 sets, as a screen sharing area, the area of the display frame 112 in the entire area of the display screen 111.

The frame formation of the display frame 112 is not limited to the formation by the user drawing with the touch pen, and the user may form the frame with a mouse, a keyboard, or the like. The information processing apparatus 100 (or a spatial UI unit device 301) may hold frame information sets of display frames 112 in various sizes in advance, and allow the user to select the frame information set of a desired size.

The display frame 112 is equivalent to, for example, a pseudo digital card, and the information processing apparatus 100 displays the screen of a predetermined user (terminal 120) as a card in the display frame 112 portion on the display screen 111 of the digital discussion board. As a result, in a situation where multiple users are seated at a table for a meeting or the like, the screen of the terminal 120 of a certain user is enabled to be imported and displayed in the display frame 112 portion on the display screen 111 (digital discussion board) shared by the multiple users. In this state, the screen of the terminal 120 of the certain user being displayed in the display frame 112 is also enabled to be shared.

The display frame 112 is, for example, of a card application (card app) for displaying a digital card. The spatial UI system (for example, the information processing apparatus 100) executes the program of the card app, the camera of the spatial UI system detects the trace of the touch pen on the table or the like in the meeting room, and the display frame 112 corresponding to the trace detected by the camera is displayed on the display screen 111.

Description will be given of a control example of the information processing apparatus 100 in response to a screen sharing operation by a user. For example, a case will be described in which a screen having the same display content as the screen 1 (121) being displayed on the terminal 1 (120a) by the user of the terminal 1 (120a) illustrated in FIG. 1 is displayed on the display screen 111 (in the display frame 112 portion) of the display 110.

In this case, first, the user draws the display frame 112 in a desired size on the display screen 111 of the display 110 with a touch pen or the like. The display 110 detects touch positions of the touch pen on the display screen 111 to continuously detect a closed line segment corresponding to the display frame 112, and outputs the closed line segment to the information processing apparatus 100. Accordingly, the information processing apparatus 100 sets the position of the display frame 112 on the display screen 111 at time t0. Time t is, for example, a time when the closed line segment is drawn as the display frame 112.

The information processing apparatus 100 waits, for a certain period of time (timer period) T, for an input of a screen sharing request from the terminal 120 that intends to cause the screen to be shared in the display frame 112 portion. The certain period of time T is measured with a start timing set to time t0 when the display frame 112 is drawn.

After that, the user who has drawn the display frame 112 performs a shake operation of the carrying terminal 1 (120a) for screen sharing, Thus, the terminal 1 (120a) outputs a screen sharing request based on the shake operation to the information processing apparatus 100.

The information processing apparatus 100 permits (OK) the screen sharing request from the terminal 1 (120a) because the terminal 1 (120a) is shaken at time t1 within the certain period of time T. Thereafter, the information processing apparatus 100 displays display data of the screen 1 (121) output from the terminal 1 (120a) in the display frame 112 portion on the display screen 111 of the display 110.

When two or more screen sharing requests are not received within the certain period of time T, for example, when a screen sharing request is received from only one terminal 1 (120a), the information processing apparatus 100 permits (OK) the screen sharing request from the terminal 1 (120a) at the elapse of the certain period of time T (at time t3). In this operation, the terminal 1 (120a) is associated as the terminal to be permitted to display the screen in the display frame 112, and the display data output from the terminal 1 (120a) is displayed in the display frame 112 portion on the display 110.

Next, description will be given of control performed by the information processing apparatus 100 when multiple screen sharing requests are received within the certain period of time T. As similarly to the above case, the terminal 1 (120a) is shaken at time t1 within the certain period of time T, and the terminal 1 (120a) outputs a screen sharing request. The terminal 2 (120b) is shaken at time t2 within the certain period of time T, and the terminal 2 (120b) outputs a screen sharing request.

When the information processing apparatus 100 receives the multiple screen sharing requests from the multiple terminals 1 and 2 (120a and 120b) within the certain period of time T, the information processing apparatus 100 judges that it is not possible to determine which of the terminal 1 (120a) and the terminal 2 (120b) is the terminal 120 to be permitted to display the screen in the display frame 112 (N/A). At a predetermined position (for example, on the display frame 112) on the display screen 111 of the display 110, the information processing apparatus 100 displays a guide 113 for determining the terminal 120 to be permitted to display the screen in the display frame 112. The guide 113 gives a message, for example, "Please shake again" to the user.

Here, the user of the terminal 1 (120a) is the right user who draws the display frame 112 on the display 110 and then shakes the terminal 1 (120a) with the intention of screen sharing. However, if the user of the other terminal 2 (120b) shakes the terminal 2 (120b) within the certain period of time T, the terminal 120 to be permitted to display the screen in the display frame 112 may fail to be determined as described above. This situation occurs, for example, when the user of the terminal 2 (120b) shakes the terminal 2 (120b) within the certain period of time T without the intention of screen sharing. For example, when the user of the terminal 2 (120b) moves in the meeting room, the terminal 2 (120b) may judge that the shaking along with the movement is a shake operation.

In this case, the information processing apparatus 100 displays the guide 113 at the display frame 112 on the display 110. Only one terminal 1 (120a) is shaken within another certain period of time T measured with the start timing set to the display start time of the guide 113. In this case, at the elapse of the certain period of time T, the information processing apparatus 100 permits (OK) the screen sharing request from the terminal 1 (120a), and causes the display frame 112 portion on the display screen 111 of the display 110 to display the display data of the terminal 1 (120a).

When screen sharing requests are received from both the terminals 1 and 2 (120a and 120b) within the certain period of time T after the display of the guide 113, the guide 113 is displayed on the display screen 111 again repeatedly.

As described above, the information processing apparatus 100 determines the operation target object (the screen 1 of the terminal 1 (120a)) to be displayed on the display screen 111 shared by the multiple users by using the certain period of time T. When only the terminal 1 (120a) that is the right terminal which has made the screen sharing request is shaken within the certain period of time T, the information processing apparatus 100 associates the screen 1 (121) of the terminal 1 (120a) with the display frame 112 and displays the screen 1 (121) in the display frame 112.

On the other hand, when the terminal 2 (120b) other than the terminal 1 (120a) is also shaken and the multiple screen sharing requests are input within the certain period of time T, the information processing apparatus 100 judges that it is not possible to determine the operation target object to be associated with the display frame 112. In this case, the information processing apparatus 100 does not associate the operation target object with the display frame 112 and thereby avoids the associating of an incorrect operation target object. The information processing apparatus 100 displays the guide 113 on the display screen 111 of the display 110 and prompts the user to perform a shake operation again. When only one terminal 120 (terminal 1 (120a)) is shaken within the certain period of time T, the screen 1 (121) of the terminal 1 (120a) is associated with the display frame 112, and the screen 1 (121) is displayed in the display frame 112.

The above mode of processing is described using the example in which one display frame 112 is drawn on the display screen 111. However, the above processing is not limited to the above case. Even when multiple display frames 112 are drawn on the display screen 111, the information processing apparatus 100 is able to associate each display frame 112 with an operation target object of the terminal 120 to be permitted to display the screen through processing similar to the above processing. In another mode of processing, the information processing apparatus 100 sets and stores, as an association probability model in advance, a probability depending on a period of time after the display frame 112 is drawn until the user shakes the terminal 120. The information processing apparatus 100 may also associate the operation target object with the display frame 112 by calculating the association probability of associating the operation target object with the display frame 112 based on the time when the terminal 120 is actually shaken after the drawing of the display frame 112. Details of this mode of processing will be described later.

The above-described processing enables the display frame 112 portion drawn by the user on the display screen 111 of the display 110 to display the screen (operation target object) of the terminal 120 of a certain user in order for multiple users to carry out collaborative work or the like. As a result, the small screen of the terminal 120 is enabled to be displayed on the large display 110, and the multiple users are enabled to share the screen.

In this processing, in response to a screen sharing request made through the shake operation of the terminal 120, the information processing apparatus 100 associates the operation target object of the terminal 120 with the display frame 112 and displays the operation target object in the display frame 112. When two or more terminals 120 are shaken after a user draws the display frame, the guide 113 is displayed to prompt the user to perform a shake operation again because it is not possible to determine the terminal 120 to be associated with the display frame 112. This makes it possible to avoid a situation where shake operations of multiple terminals bring about a failure in determining the operation target object to be associated with the display frame, and thereby to appropriately associate the screen (operation target object) of the terminal 120 of the requesting user with the display frame 112 and display the screen in the display frame 112.

Figure 2:
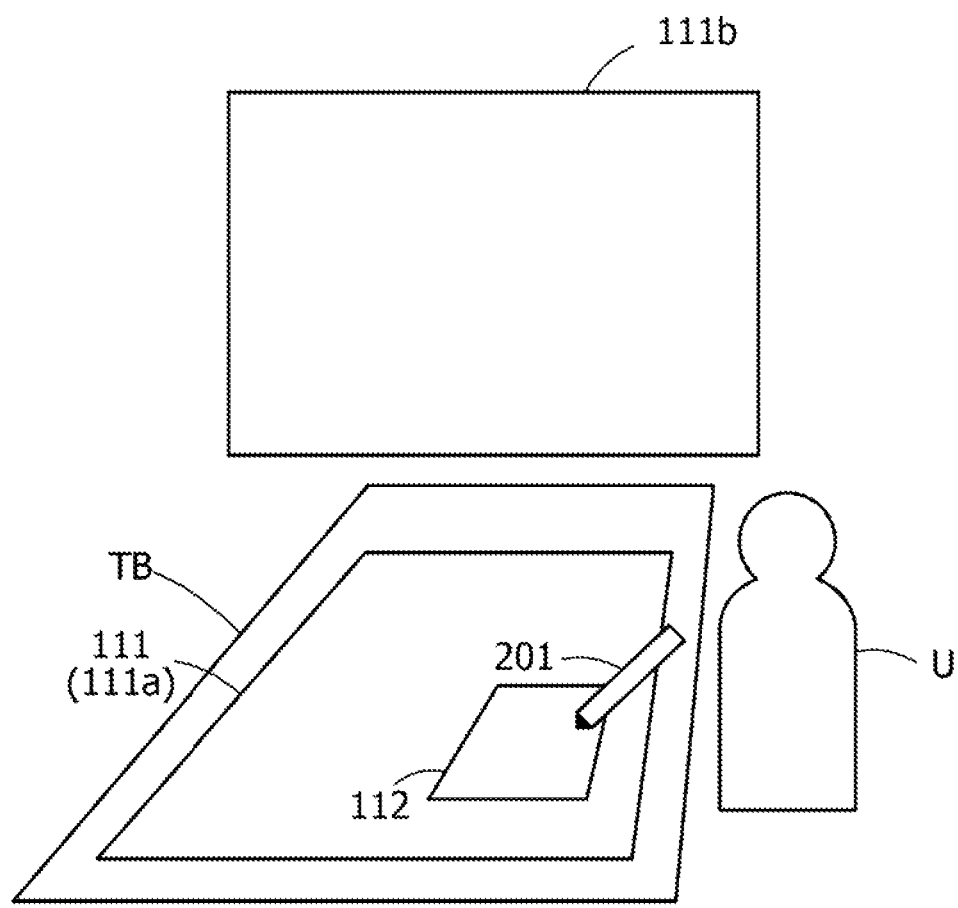
FIG. 2 is a diagram illustrating an example of a spatial UI system used by the information processing apparatus according to the embodiment.

FIG. 2 is a diagram illustrating an example of a spatial UI system used by the information processing apparatus according to the embodiment. The information processing apparatus 100 is coupled to each of devices in the spatial UI system and controls the above-described associating of the operation target object with the display frame via the devices in the spatial UT system.

Examples of the devices used as the spatial UI system will be described with reference to FIG. 2. In a room such as a meeting room, a table TB is installed, and a touch panel 111a is arranged on top of the table TB to display the aforementioned display screen 111, The touch panel 111a detects that a user U participating in a meeting draws the display frame 112 by operating a touch pen 201.

The information processing apparatus 100 outputs display data of the display screen 111 and the display frame 112 to the touch panel 111a. The information processing apparatus 100 receives coordinate positions of the display frame 112 input from the touch pen 201 during drawing, and outputs the display data of the display frame 112 corresponding to the coordinate positions to the touch panel 111a for display.

The display screen 111 may be projection display by a projector. In this case, images captured by a camera that captures images of the table TB may be input for the coordinate positions of the display frame 112 drawn on the display screen 111 projected by the projector. In this case, the devices in the spatial UI system or the information processing apparatus 100 may perform image processing on the images captured by the camera and thereby detect the formation state of the display frame 112.

The display screen 111 is a presented image for allowing multiple users to share the screen, and may be presented on the table TB in a non-limiting example. Instead, the display screen 111 may be displayed on a touch panel 111b installed on a wall or be projected by using a projector. The display screen 111 may be displayed on both touch panels 111a and 111b installed on the table TB and the wall, respectively.

Figure 3:
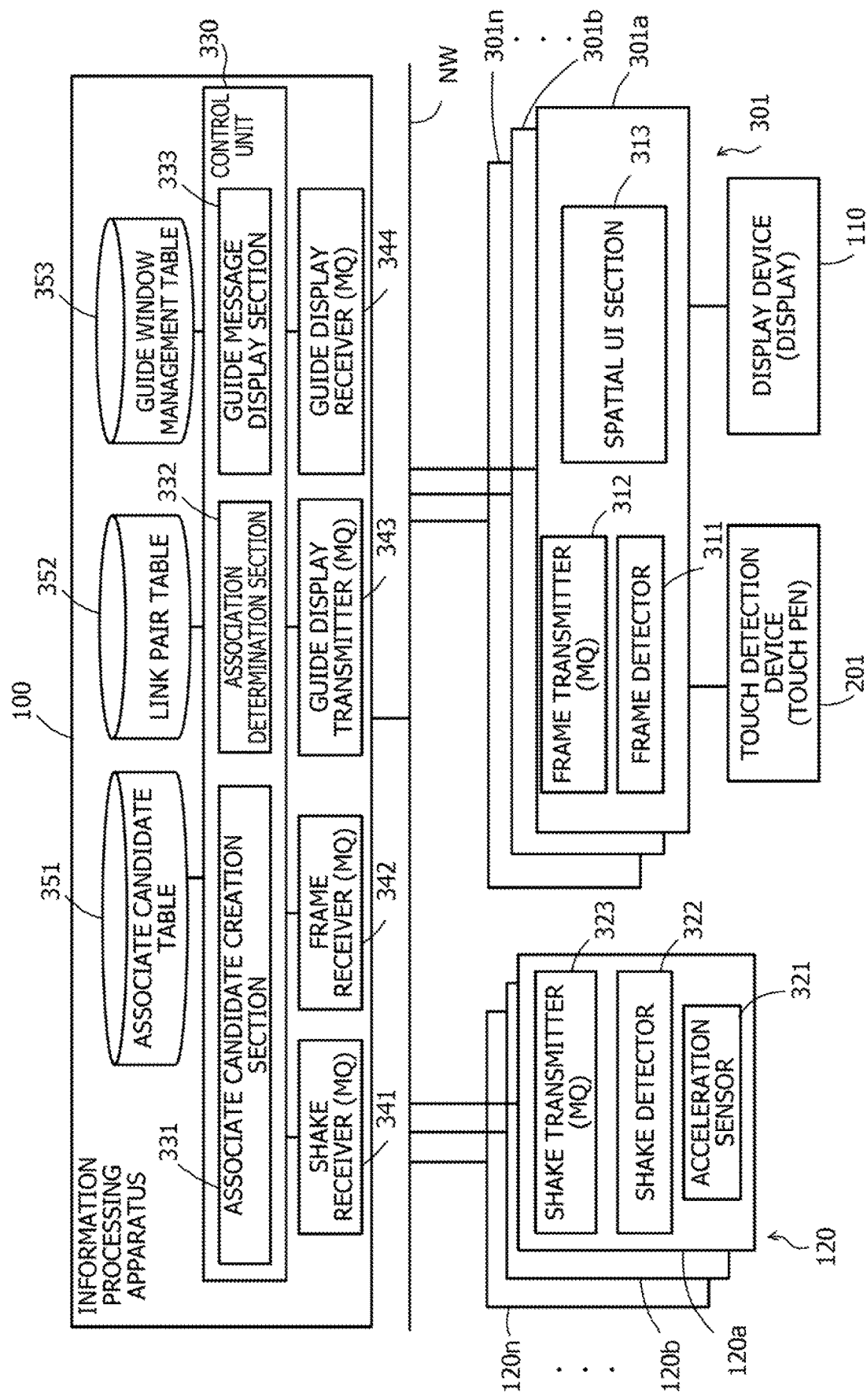
FIG. 3 is a diagram illustrating a configuration example of a spatial UI system including the information processing apparatus according to the embodiment.

FIG. 3 is a diagram illustrating a configuration example of a spatial UI system including the information processing apparatus according to the embodiment. In FIG. 3, the above-described information processing apparatus 100 is coupled to the devices in the spatial UI system via the network NW.

The terminals 120 and spatial UI unit devices (personal computers: PCs) 301 are coupled to the network NW, and the information processing apparatus 100 inputs and outputs data from and to the terminals 120 and the spatial UI unit devices 301. The spatial UI unit device 301 is provided in each certain space (an area such as a room) such as a meeting room. In the example of FIG. 3, n spatial UI unit devices 301a to 301n are provided respectively corresponding to multiple rooms.

A touch detection device (the touch pen 201) and a display device (the display 110 and the touch panel 111) are coupled to one spatial UI unit device 301. The spatial UI unit device 301 includes a frame detector 311, a frame transmitter 312, and a spatial UI section 313.

The spatial UI section 313 executes the program of an application in a general-purpose spatial UI technique, for example, for transmission of display data to the display 110 and reception of data of a coordinate position at a touch operation detected by the touch pen 201. The spatial UI section 313 transmits and receives these kinds of data to and from the information processing apparatus 100 via the network NW. In addition, in the embodiment, the spatial UI section 313 transmits and receives data to and from the terminal 120 associated with the display frame 112. For example, the spatial UI section 313 performs control to determine the terminal 120 associated with the display frame 112 from a link pair table 352 of the information processing apparatus 100, and display the screen of the determined terminal 120 in the display frame 112.

The frame detector 311 and the frame transmitter 312 execute the program of an application for the above-described screen sharing as one of applications in the spatial UI technique. The frame detector 311 determines the formation state of one closed frame (display frame 112) based on the trace of the coordinate positions detected during the touch operation by the touch pen 201.

For example, the frame detector 311 detects a touch point of the touch pen 201 on the display 110. If the touch point is on an extension line of a trace already being tracked, the frame detector 311 regards the touch point as a continuation of the trace and extends the trace. A new touch point that is off an extension line of a trace is stored as a new trace on a memory. On the other hand, if the trace being tracked is not continued any more, the trace is determined as ended (the end of the touch operation) and is deleted from the memory.

When the frame detector 311 judges that the display frame 112 is formed, the frame detector 311 detects the coordinate positions of the entire display frame 112 and outputs frame information on the display frame 112 to the information processing apparatus 100 via the frame transmitter 312. For example, the coordinate positions of the continuous line segment of the entire display frame 112 or the coordinate positions of two different points on a diagonal line of the display frame 112 are output to the information processing apparatus 100.

As a result, the information processing apparatus 100 is able to generate image data of the hand-written display frame 112 as illustrated in FIG. 1 based on the coordinate positions of the continuous line segment. The information processing apparatus 100 is also able to generate image data of the rectangular display frame 112 based on an input of the coordinate positions of the two different points.

In an area such as a room managed by one spatial UI unit device 301, n users gather at a meeting or the like, and multiple terminals 120 (120a to 120n) are located. In the terminal 120, for example, communication functions and various applications for a smartphone or the like are implemented, and an application for the above-described screen sharing is implemented as one of the applications.

The terminal 120 includes an acceleration sensor 321, a shake detector 322, and a shake transmitter 323. The shake detector 322 and the shake transmitter 323 correspond to the application for screen sharing and are implemented through program execution. When the user shakes the terminal 120, the acceleration sensor 321 detects an acceleration according to the shake operation.

The shake detector 322 judges whether the terminal 120 has been shaken based on the detected acceleration. The shake operation is, for example, an operation in which the user shakes the terminal 120 vertically or horizontally several times. When the amplitude of the acceleration by the shake operation (the value of the movement of the terminal 120) is equal to or greater than a predetermined value, the shake detector 322 judges that the terminal 120 has been shaken, and outputs (transmits) a screen sharing request from the shake transmitter 323 to the information processing apparatus 100 via the network NW.

The information processing apparatus 100 includes a control unit 330, a shake receiver 341, a frame receiver 342, a guide display transmitter 343, a guide display receiver 344, an associate candidate table 351, the link pair table 352, and a guide window management table 353.

The control unit 330 controls the entire information processing apparatus 100, and includes an associate candidate creation section 331, an association determination section 332, and a guide message display section 333. The associate candidate creation section 331, the association determination section 332, and the guide message display section 333 are implemented by an application having their respective functions.

The associate candidate creation section 331 judges a candidate for a device (terminal 120) to transmit an operation target object to be displayed in the display frame 112, and stores information on the associate candidate in the associate candidate table 351. For this candidate judgement, the associate candidate creation section 331 uses the frame information transmitted from the spatial UI unit device 301 and the screen sharing request made through the shake operation of the terminal 120. The associate candidate creation section 331 forms pairs of the multiple display frames 112 and the multiple terminals 120, calculates the probability of association (association probability) for each pair, and stores the association probability in the associate candidate table 351.

For example, for a new display frame 112, the associate candidate creation section 331 activates a timer for a predetermined period, and starts counting. If any terminal 120 is shaken within the period before a timeout, the associate candidate creation section 331 stores the association probability of the terminal 120 into the associate candidate table 351.

If a timeout occurs for the display frame 112 already being displayed, the associate candidate creation section 331 deletes the concerned display frame 112 from the associate candidate table 351. On the other hand, if a timeout is yet to occur for the display frame 112 already being displayed, the associate candidate creation section 331 calculates the association probability with the shaken terminal 120 and stores the association probability in the associate candidate table 351.

The association determination section 332 reads an associate candidate from the associate candidate table 351 and determines an association of the device (terminal 120) to transmit an operation target object to be displayed in the display frame 112. The association determination section 332 stores link pair information in which the determined terminal 120 and the display frame 112 are associated with each other into the link pair table 352.

For example, the association determination section 332 reads the highest value and the second highest value of the association probabilities from the associate candidate table 351, determines an association of the terminal 120 with the display frame 112 based on these association probabilities, and writes the determination result in the link pair table 352. In a case where it is not possible to determine any association, the association determination section 332 writes a message of the guide 113 to the guide display transmitter 343.

The guide message display section 333 controls notification (display) of the guide 113 on the display 110. As described above, when an operation target object to be displayed in the display frame 112 fails to be determined because multiple terminals 120 are shaken, the guide message display section 333 displays the guide 113 on the display 110 via the spatial UI unit device 301. The guide message display section 333 stores display information of the guide 113 to be displayed on the display 110 into the guide window management table 353.

For example, the guide message display section 333 reads the message of the guide 113 from the guide display transmitter 343. If the message is, for example, a "display" command, the guide message display section 333 displays a predetermined message of the guide 113 on the display 110 via the spatial UI unit device 301. If the message of the guide 113 from the guide display transmitter 343 is a "delete" command, the guide message display section 333 performs control to delete the message of the guide 113 being displayed on the display 110.

The frame transmitter 312 of the spatial UI unit device 301, the shake transmitter 323 of the terminal 120, and the shake receiver 341, the frame receiver 342, the guide display transmitter 343, and the guide display receiver 344 of the information processing apparatus 100 are message queues (MQ) for event transmission and reception.

The shake transmitter 323 of the terminal 120 and the shake receiver 341 of the information processing apparatus 100 transmit and receive messages between the shake detector 322 of the terminal 120 and the associate candidate creation section 331 of the information processing apparatus 100. The frame transmitter 312 of the spatial UI unit device 301 and the frame receiver 342 of the information processing apparatus 100 transmit and receive messages between the frame detector 311 of the spatial UI unit device 301 and the associate candidate creation section 331 of the information processing apparatus 100. The guide display transmitter 343 and the guide display receiver 344 of the information processing apparatus 100 transmit and receive messages among the associate candidate creation section 331, the association determination section 332, and the guide message display section 333.

Figure 4:
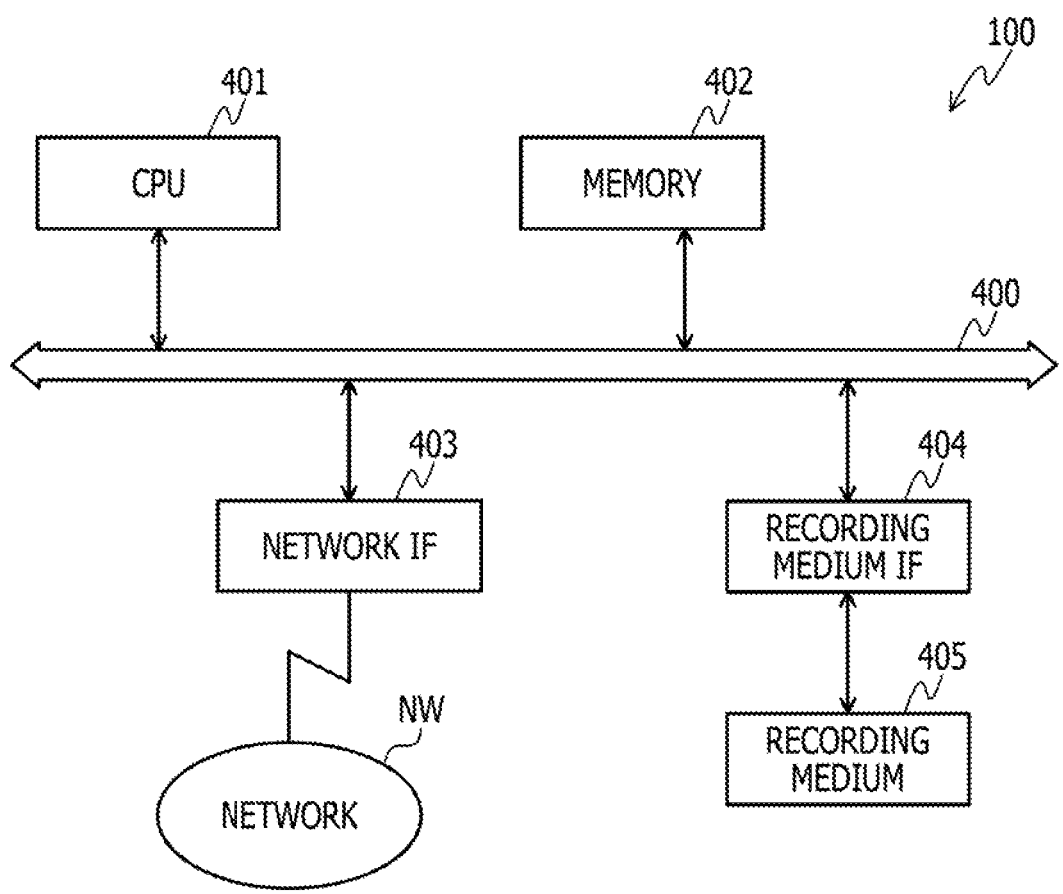
FIG. 4 is a diagram illustrating a hardware configuration example of the information processing apparatus according to the embodiment.

FIG. 4 is a diagram illustrating a hardware configuration example of the information processing apparatus according to the embodiment. The information processing apparatus 100 may be configured by, for example, a general-purpose PC or server composed of hardware illustrated in FIG. 4.

The information processing apparatus 100 includes a central processing unit (CPU) 401, a memory 402, a network interface (IF) 403, a recording medium IF 404, a recording medium 405, and so on. 400 is a bus through which the above blocks are coupled to each other.

The CPU 401 is an arithmetic processing device that functions as a controller that controls the entire information processing apparatus 100. The memory 402 includes non-volatile memory and volatile memory. The non-volatile memory is, for example, a read-only memory (ROM) which stores a program for the CPU 401. The volatile memory is, for example, a dynamic random-access memory (DRAM), static random-access memory (SRAM), or the like used as a work area of the CPU 401.

The network IF 403 is a communication interface for the network NW such as a local area network (LAN), a wide area network (WAN), or the Internet. The information processing apparatus 100 is communicably coupled to the network NW via the network IF 403, and communicates with the terminals 120 and the spatial UI unit devices 301.

The recording medium IF 404 is an interface for reading and writing information processed by the CPU 401 from and to the recording medium 405. The recording medium 405 is a recording medium to assist the memory 402. As the recording medium 405, for example, a hard disk drive (HDD), a solid-state drive (SSD), a Universal Serial Bus (USB) flash drive, or the like may be used.

Executing the program recorded in the memory 402 or the recording medium 405, the CPU 401 is enabled to implement each of the functions (the associate candidate creation section 331, the association determination section 332, and the guide message display section 333) of the control unit 330 of the information processing apparatus 100. The memory 402 and the recording medium 405 record and hold information handled by the information processing apparatus 100. For example, the memory 402 and the recording medium 405 hold information in the aforementioned tables (such as the associate candidate table 351, the link pair table 352, and the guide window management table 353). The memory 402 and the recording medium 405 also hold the queue data in the shake receiver 341, the frame receiver 342, the guide display transmitter 343, and the guide display receiver 344.

Each of the terminals 120 and the spatial UI unit devices 301 described above may also be configured by general-purpose hardware as illustrated in FIG. 4.

(Processing Example of Displaying Screen of Terminal in Display Frame)

Next, description will be given of processing examples of the information processing apparatus 100 for determining an association of a terminal 120 whose screen will be displayed in the display frame 112.

Figure 5:
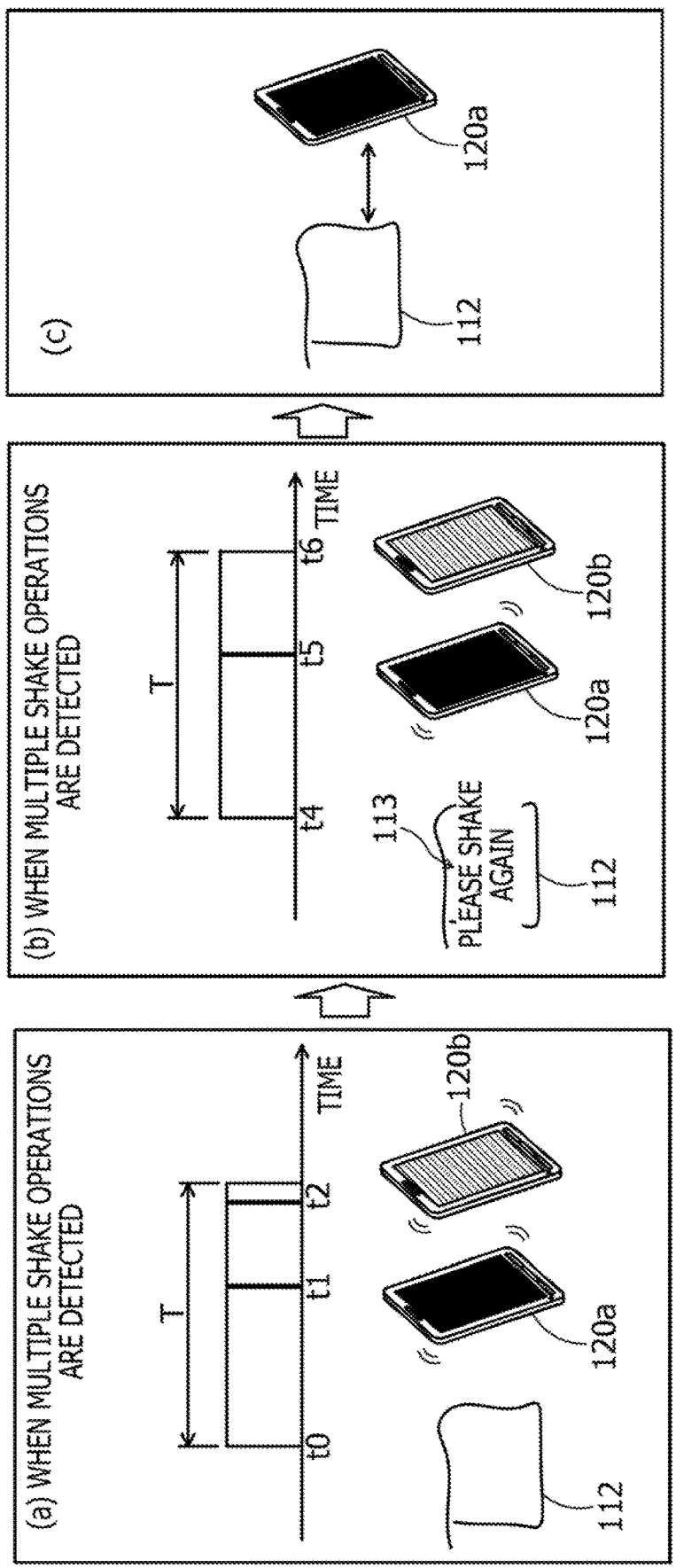
FIG. 5 includes diagrams illustrating a processing example of associating a terminal with a display frame.

Processing Example 1: Processing Example of Determining One Terminal for One Display Frame FIG. 5 includes diagrams illustrating a processing example of associating a terminal with a display frame. FIG. 5(a) illustrates a case where the users of multiple terminals 120a and 120b perform shake operations after a display frame 112 is drawn. For example, a user who intends to share the screen is the user of the terminal 120a, and the user of the terminal 120a operates the touch pen on the display 110 to draw the display frame 112 (at time t0).

In response to this, the information processing apparatus 100 waits for an input of a screen sharing request for the certain period of time T from time t0. The user of the terminal 120a performs the shake operation of the terminal 1 (120a) during a certain period of time T (at time t). The user of the terminal 2 (120b) also performs the shake operation of the terminal 2 (120b) during the certain period of time T (at time t2). Here, the user of the terminal 2 (120b) unintentionally shakes the terminal 2 (120b) by a quasi-shake operation in which the user does not intend to make a screen sharing request but just moves to another seat, for example.

In this manner, the information processing apparatus 100 receives the shake operations (screen sharing requests) from the multiple terminals 1 and 2 (120a and 120b) within the certain period of time T. In this case, the information processing apparatus 100 judges that it is not possible to determine which of the terminal 1 (120a) and the terminal 2 (120b) is the terminal 120 to be permitted to display the screen in the display frame 112 (N/A).

In this case, at a predetermined position (for example, on the display frame 112) on the display screen 111 of the display 110, the information processing apparatus 100 displays the guide 113 for prompting the user of the terminal 120a who has made the screen sharing request to perform a shake operation again, as illustrated in FIG. 5(b).

The information processing apparatus 100 again waits for an input of a screen sharing request within another certain period of time T from a start time (t4) of displaying the guide 113. Here, only the proper user who intends to share the screen performs the shake operation of the terminal 1 (120a) during the certain period of time T (at time t). As a result, the information processing apparatus 100 permits (OK) the screen sharing request from the terminal 1 (120a) at the elapse of the certain period of time T (at time t).

Thereafter, as illustrated in FIG. 5(c), the information processing apparatus 100 causes the display frame 112 portion on the display screen 111 of the display 110 to display the display data of the terminal 1 (120a). Thus, multiple users are enabled to share the screen of the terminal 1 (120a).

If the information processing apparatus 100 receives screen sharing requests from multiple terminals 120 again within the certain period of time T after the guide 113 is displayed, the information processing apparatus 100 repeats displaying of the guide 113 on the display screen 111 again.

Figure 6:
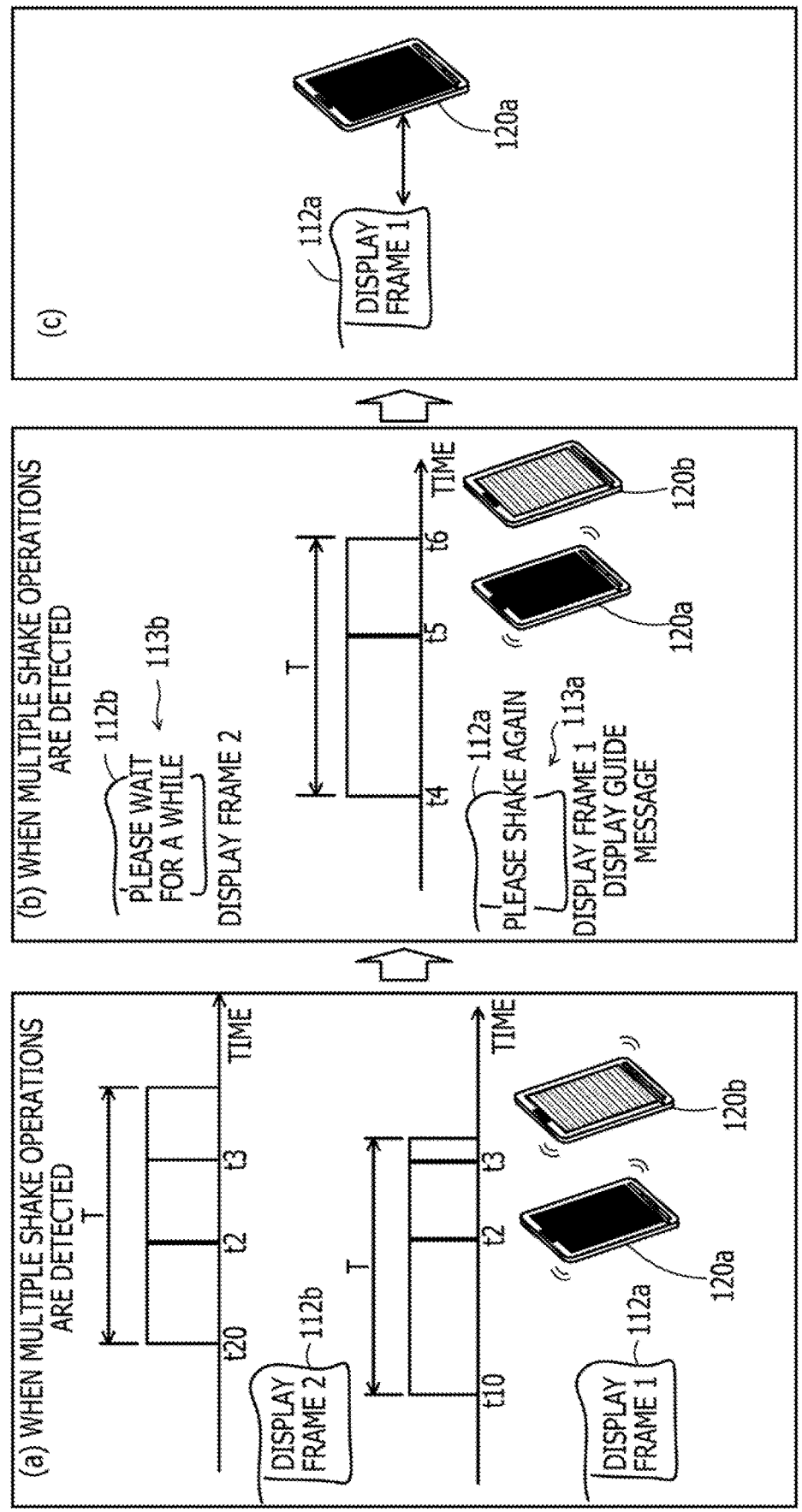
FIG. 6 includes diagrams illustrating a processing example of associating multiple terminals with multiple display frames, respectively.

Processing Example 2: Processing Example of Determining One Terminal for Each of Multiple Display Frames FIG. 6 includes diagrams illustrating a processing example of associating multiple terminals with multiple display frames, respectively. FIG. 6(a) illustrates a case where the users of multiple terminals 120 perform shake operations after two display frames 112 are drawn. For example, the user of the terminal 1 (120a) operates the touch pen on the display 110 to draw the display frame 1 (112a) (at time t10). The user of the terminal 2 (120b) also operates the touch pen on the display 110 to draw the display frame 2 (112b) (at time t20). As described above, there may be a case where the multiple users perform operations for sharing the screens of the terminals 1 and 2 (120a and 120b) at substantially the same time on one display 110.

In such a case, the information processing apparatus 100 waits for an input of a screen sharing request for the display frame 1 (112a) for a certain period of time T from time t10, Concurrently, the information processing apparatus 100 waits for an input of a screen sharing request for the display frame 2 (112b) for the certain period of time T from time t20. The certain periods of time (timer periods) T respectively measured for the display frames 1 and 2 (112a and 112b) temporally overlap with each other.

The user of the terminal 120a performs a shake operation of the terminal 1 (120a) within the certain period of time T (at time t2). The user of the terminal 2 (120b) also performs a shake operation of the terminal 2 (120b) within the certain period of time T (at time t3).

In this manner, the information processing apparatus 100 receives the shake operations (screen sharing requests) from the multiple terminals 1 and 2 (120a and 120b) within the certain period of time T. In this case, the information processing apparatus 100 judges that it is not possible to determine which of the terminal 1 (120a) and the terminal 2 (120b) is the terminal 120 to be permitted to display the screen in the display frame 1 (112a) (N/A). Similarly, the information processing apparatus 100 also judges that it is not possible to determine which of the terminal 1 (120a) and the terminal 2 (120b) is the terminal 120 to be permitted to display the screen in the display frame 2 (112b) (N/A).

In this case, as illustrated in FIG. 6(b), the information processing apparatus 100 displays a guide 113a giving a prompt to perform a shake operation again on one of the display frames 112, for example, the display frame 1 (112a). The information processing apparatus 100 displays a guide 113b reporting a status waiting for a screen sharing request reception on the other display frame 112, for example, the display frame 2 (112b). The guide 113b for waiting displays, for example, "Please wait for a while".

Accordingly, the information processing apparatus 100 is enabled to perform control to first determine the terminal 120 whose screen will be shared in the display frame 1 (112a) and then determine the terminal 120 whose screen will be shared in the display frame 2 (112b).

The information processing apparatus 100 waits for an input of a screen sharing request again for another certain period of time T from the display start time (t4) of the guide 113a on the display frame 1 (112a). If the terminal 1 (120a) is shaken within the certain period of time T (at time t5), the information processing apparatus 100 permits (OK) the screen sharing request from the terminal 1 (120a) at the elapse of the certain period of time T (at time t6).

Thereafter, as illustrated in FIG. 6(c), the information processing apparatus 100 displays the display data of the terminal 1 (120a) in the display frame 112 portion on the display screen 111 of the display 110. Thus, multiple users are enabled to share the screen of the terminal 1 (120a).

Thereafter, the information processing apparatus 100 performs control to determine the terminal 120 to be permitted to display the screen in the display frame 2 (112b). First, the information processing apparatus 100 gives a prompt to perform a shake operation again in the guide 113b on the display frame 2 (112b), and then waits for an input of a screen sharing request again within another certain period of time T from the display start time of the guide 113b on the display frame 2 (112b) (equivalent to t4). If the terminal 2 (120b) is shaken within the certain period of time T (equivalent to time t), the information processing apparatus 100 permits (OK) the screen sharing request from the terminal 2 (120b) at the elapse of the certain period of time T (equivalent to time t6). Thus, the display data of the terminal 2 (120b) is displayed in the display frame 2 (112b) portion on the display screen 111 of the display 110, and multiple users are enabled to share the screen of the terminal 2 (120b).

Processing Example 3: Processing Example of Determining Terminal for Display Frame Using Association Probability In the following example, an association probability for each terminal 120 with a display frame 112 is stored in advance in the information processing apparatus 100. When the display frame 112 is actually drawn, the information processing apparatus 100 calculates the association probability and determines an association of the terminal 120 for display in the display frame 112.

The probability depending on a period of time after the user starts drawing only one display frame 112 until the user actually shakes the terminal 120 is modeled in the form of, for example, a normal distribution, and is stored in the information processing apparatus 100 as an association probability model. The information processing apparatus 100 uses the association probability model to calculate the association probability at the time when the user actually performs the shake operation after drawing the display frame 112, and determines the terminal 120 to be associated with the display frame 112 based on the association probability.

After the display frame 112 is drawn, the information processing apparatus 100 detects shake operations from multiple terminals 120 substantially simultaneously (for example, within a predetermined period of time approximate to the certain period of time T). In this case, when a difference between the highest association probability and the next highest (second highest) association probability is equal to or larger than a certain threshold, the terminal 120 having the highest association probability is determined as a paired terminal to be associated with the display frame 112. When the difference from the second highest association probability is smaller than the certain threshold, for example, when it is difficult to make the determination, the information processing apparatus 100 displays the guide 113 in the same manner as described above and prompts the user to perform a shake operation again.

Figure 7:
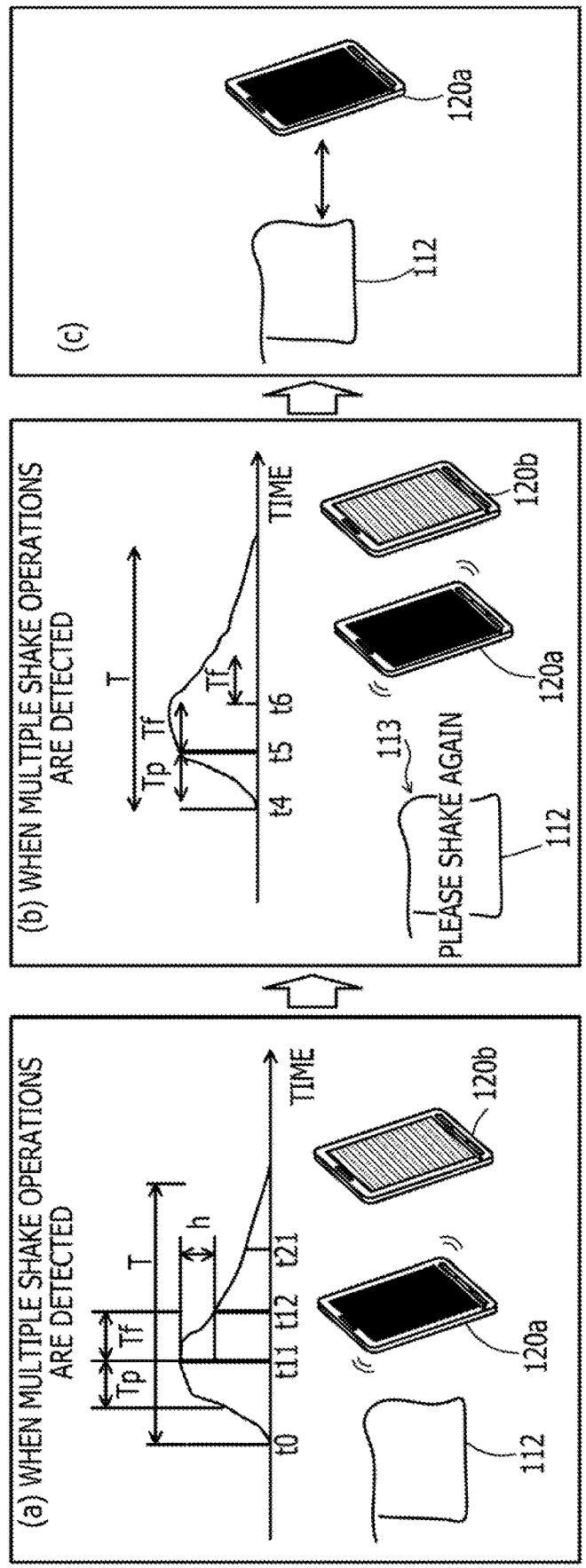
FIG. 7 includes diagrams illustrating a processing example using an association probability for associating a terminal with one display frame.

FIG. 7 includes diagrams illustrating a processing example using an association probability for associating a terminal with one display frame. FIG. 7(a) illustrates a case where the users of the multiple terminals 120a and 120b perform shake operations after one display frame 112 is drawn. For example, a user who intends to share the screen is the user of the terminal 120a, and the user of the terminal 120a operates the touch pen on the display 110 to draw the display frame 112 (at time t0).

In response to this, the information processing apparatus 100 refers to the pre-stored association probability. In the illustrated distribution of the association probability, the horizontal axis represents the time and the vertical axis represents the probability. The association probability has a distribution characteristic of the probability depending on a period (time) from time t0 as a start time until the user actually shakes the terminal 120. The terminal 120 to be associated with the display frame 112 is determined based on the time when the user actually performs the shake operation (screen sharing request).

The association probability has a peak with the highest probability at time t11. For example, here, the user of the terminal 120a shakes the terminal 1 (120a) at time t11. Then, the information processing apparatus 100 does not detect a shake operation from the other terminal 2 (120b) within a period (latter determination period Tf) until time t12 when the probability is decreased by a prescribed value h (for example, decreased by 30%) from the probability at time t11 when the shake operation is performed. For example, the terminal 2 (120b) is shaken at time t21 after time t12.

In this case, at time t12, it is possible to determine the terminal 1 (120a) to be permitted to display the screen in the display frame 112. Thus, the use of the association probability makes it possible to determine the terminal 1 (120a) (OK) at an early time (time t12) and thereby share the screen in a short time. Although the timer period (certain period of time) T is also presented for reference, the processing using the association probability makes it possible to determine the terminal 1 (120a) to be associated with the display frame 112 at an early time (time t12) without waiting for the timeout of the certain period of time T (equivalent to time t6 in FIG. 5).

In another case, the other terminal 2 (120b) is shaken before time t12. In this case, the information processing apparatus 100 judges that it is not possible to determine which of the terminal 1 (120a) and the terminal 2 (120b) is the terminal 120 to be permitted to display the screen in the display frame 112 (N/A).

In this case, as illustrated in FIG. 7(b), the information processing apparatus 100 causes the display screen 111 (display frame 112) of the display 110 to display the guide 113 giving a prompt to perform a shake operation again.

From the display start time t4 of the guide 113, the information processing apparatus 100 refers to the association probability again and waits for an input of a shake operation (screen sharing request) again. The terminal 1 (120a) is shaken again at time t5. Then, a shake operation of the other terminal 120 (terminal 120b) is not performed within the range of a former determination period Tp and a latter determination period Tf around the shake operation (time t5). In addition, a shake operation of the other terminal 120 (terminal 120b) is not performed either within the range of the former determination period Tp and the latter determination period Tf around the probability peak value (time t1). In this case, the information processing apparatus 100 is able to determine the terminal 1 (120a) to be associated with the display frame 112 at the elapse of the latter determination period Tf after time t6.

Thereafter, as illustrated in FIG. 7(c), the information processing apparatus 100 displays the display data of the terminal 1 (120a) in the display frame 112 portion on the display screen 111 of the display 110. Thus, multiple users are enabled to share the screen of the terminal 1 (120a).

The above processing example is described by using the case where the shake operation of the terminal 2 (120b) is performed (at time t21) after the shake operation of the terminal 1 (120a) is performed (at time t11), The embodiments are not limited to this, and a case where the shake operation of the terminal 2 (120b) is performed before the shake operation of the terminal 1 (120a) is performed (at time t11) may be handled in a similar way.

For example, the shake operation of the terminal 2 (120b) is performed within a former determination period Tp in a time range before the shake operation (time t11) of the terminal 1 (120a), the former determination period Tp being a period having a decrease in the probability by a prescribed value (for example, a 30% decrease) from the probability at the time of the shake operation of the terminal 1 (120a). In this case, the information processing apparatus 100 fails to determine the terminal 120 to be associated with the display frame 112, and displays the guide 113 for prompting the user to perform a shake operation again on the display screen 111 (display frame 112) of the display 110. If the shake operation of the terminal 2 (120b) is performed at a time before the former determination period Tp, the information processing apparatus 100 is able to determine an association of the terminal 1 (120a) with the display frame 112.

Figure 8:
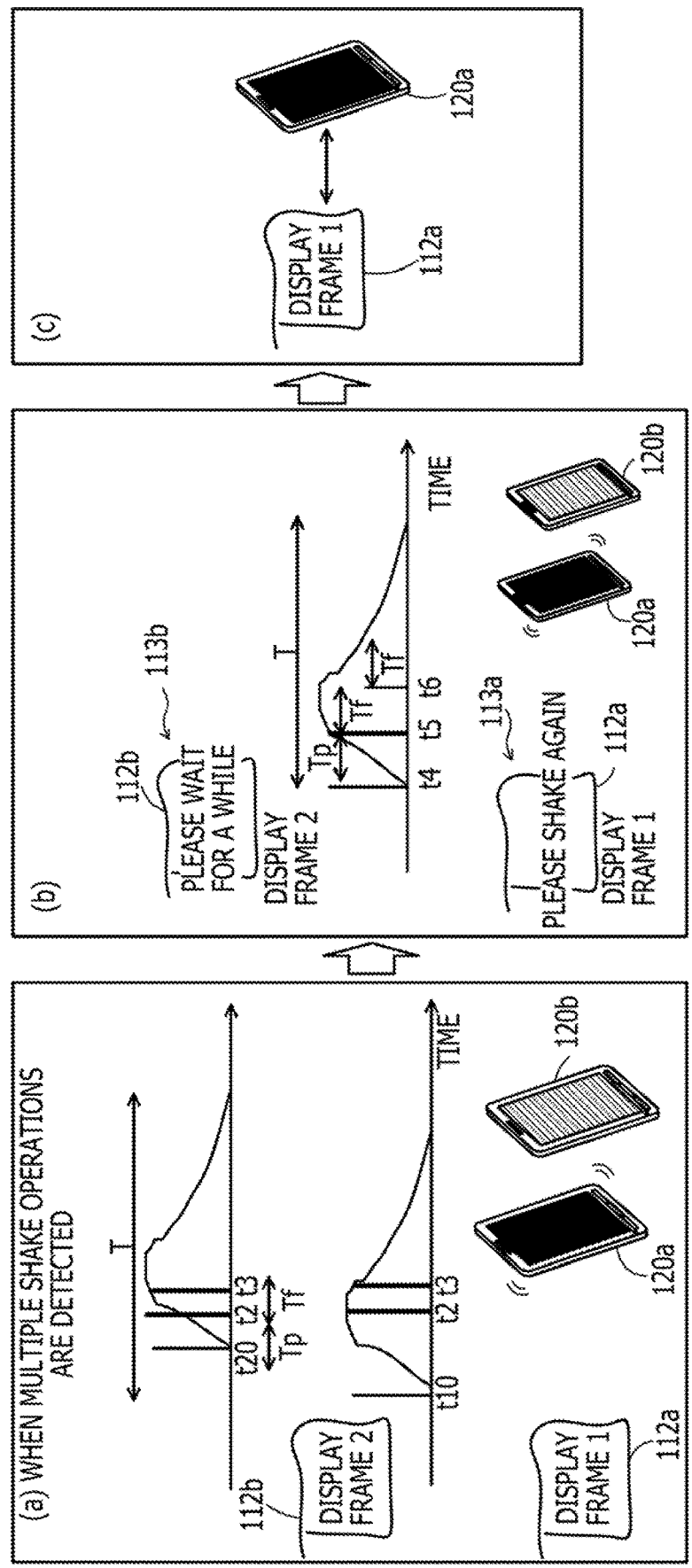
FIG. 8 includes diagrams illustrating a processing example using the association probability for associating multiple terminals with multiple display frames.

Processing Example 4: Processing Example of Determining One Terminal for Each of Multiple Display Frames Using Association Probability FIG. 8 includes diagrams illustrating a processing example using the association probability for associating multiple terminals with multiple display frames. FIG. 8(a) illustrates a case where the users of the multiple terminals 120 perform shake operations after two display frames 112 are drawn. For example, the user of the terminal 1 (120a) operates the touch pen on the display 110 to draw the display frame 1 (112a) (at time t10). The user of the terminal 2 (120b) also operates the touch pen on the display 110 to draw the display frame 2 (112b) (at time t20).

In response to them, the information processing apparatus 100 refers to the association probability stored in advance, calculates the association probability based on the time when each user actually performs a shake operation (screen sharing request), and determines the terminal 120 to be associated with each of the display frames 112.

Regarding the display frame 1 (112a), the probability at time t2 when the terminal 1 (120a) is shaken is higher than the probability at time t3 when the terminal 2 (120b) is shaken. In addition, the terminal 2 (120b) is shaken within the latter determination period Tf of the terminal 1 (120a) (at time t3). In this case, the information processing apparatus 100 judges that it is not possible to determine the terminal 120 to be associated with the display frame 1 (112a) (N/A).

Regarding the display frame 2 (112b), the probability at time t3 when the terminal 2 (120b) is shaken is higher than the probability at time t2 when the terminal 1 (120a) is shaken. In addition, the terminal 1 (120a) is shaken within the former determination period Tp of the terminal 2 (120b) (at time t2). In this case, the information processing apparatus 100 judges that it not possible to determine the terminal 120 to be associated with the display frame 2 (112b) (N/A).

In this case, as illustrated in FIG. 8(b), the information processing apparatus 100 displays a guide 113a giving a prompt to perform a shake operation again in one of the display frames 112, for example, the display frame 1 (112a). The information processing apparatus 100 displays a guide 113b indicating a status waiting for a screen sharing request reception in the other display frame 2 (112b).

Accordingly, the information processing apparatus 100 is enabled to perform control to first determine the terminal 120 whose screen will be shared in the display frame 1 (112a) and then determine the terminal 120 whose screen will be shared in the display frame 2 (112b).

The information processing apparatus 100 waits for an input of a screen sharing request again from the display start time (t4) of the guide 113a in the display frame 1 (112a). When only the terminal 1 (120a) is shaken (at time t) within the latter determination period Tf until time t6, the information processing apparatus 100 permits (OK) the screen sharing request from the terminal 1 (120a).

Thereafter, as illustrated in FIG. 8(c), the information processing apparatus 100 displays the display data of the terminal 1 (120a) in the display frame 1 (112a) portion on the display screen 111 of the display 110. Thus, multiple users are enabled to share the screen of the terminal 1 (120a).

Thereafter, the information processing apparatus 100 performs control to determine the terminal 120 to be permitted to display the screen in the display frame 2 (112b). First, the information processing apparatus 100 gives a prompt to perform a shake operation again in the guide 113b on the display frame 2 (112b), and then waits for an input of a screen sharing request again from the display start time of the guide 113b on the display frame 2 (112b) (equivalent to t4). The terminal 2 (120b) is shaken (equivalent to time t5).

Here, a shake operation of the other terminal 120 (terminal 120b) is not performed within the range of the former determination period Tp and the latter determination period Tf around the above shake operation (equivalent to time t5). In addition, a shake operation of the other terminal 120 (terminal 120b) is not performed either within the range of the former determination period Tp and the latter determination period Tf around the probability peak value (equivalent to time t6). In this case, the information processing apparatus 100 is able to determine the terminal 2 (120b) to be associated with the display frame 2 (112b) at the elapse of the latter determination period Tf after time t6.

An implementation example of the processing example 4 will be described below. The description will be given by using, as an example, a case where multiple display frames 1 (112a) and 2 (112b) are drawn and multiple terminals 1 (120a) and (120b) are shaken at close time points having a short time interval within a certain period of time as described above.

FIG. 9 is a table for explaining association probabilities between multiple display frames and multiple terminals for the information processing apparatus according to the embodiment. The vertical axis represents multiple display frames 112, and the horizontal axis represents multiple terminals 120. The information processing apparatus 100 obtains an association probability p for each association pair of a display frame 112 and a terminal 120 based on the processing in the processing example 3. For example, when the difference between the first highest probability and the second highest probability is equal to or larger than a certain threshold, the display frame 112 and the terminal 120 in the pair having the first highest probability are associated with each other.

When the difference between the first highest probability and the second highest probability is smaller than the certain threshold, for example, when it is difficult to make the determination, the information processing apparatus 100 displays, for example, "Please shake again" as the guide 113a in the display frame 1 (112a) having the first highest probability. The information processing apparatus 100 displays, for example, a message "Please wait for a while" as the guide 113b in the other display frame 2 (112b). After displaying the messages of the guides 113, the information processing apparatus 100 continues the associating processing described above.

For example, as illustrated in FIG. 9, the first and second highest probabilities are assumed to be p(1, A) and p(2, B), respectively (|p(1, A)−p(2, B)|<Threshold). In this case, the guide 113a "Please shake again" is displayed in the display frame 1 (112a), and the guide 113b "Please wait for a while" is displayed in the display frame 2 (112b).

Figure 10E:
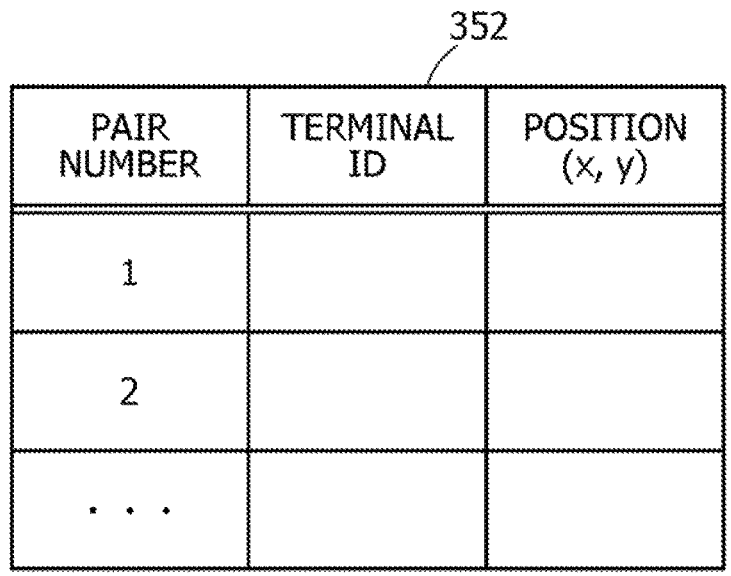
FIG. 10E is a table illustrating an example of data handled by the information processing apparatus according to the embodiment (part 5).

FIGS. 10A to 10F are tables illustrating examples of data handled by the information processing apparatus according to the embodiment. FIG. 10A illustrates a data example of the message queues (MQ) of the shake receiver 341 of the information processing apparatus 100 and the shake transmitter 323 of the terminal 120. The data of each of the message queues of the shake receiver 341 and the shake transmitter 323 includes a sequence number in a message storage order, a terminal identifier (ID) of each terminal 120 of a message transmitter, for example, IMEI, and a transmission time of the message. The IME is an abbreviation of International Mobile Equipment Identity.

FIG. 10B illustrates a data example of each of the message queues (MQ) of the frame receiver 342 of the information processing apparatus 100 and the frame transmitter 312 of the spatial UI unit device 301. The data of each of the message queues of the frame receiver 342 and the frame transmitter 312 includes the sequence number in the message storage order, an identifier (ID) of each display frame 112, a drawing time of the display frame 112, and the position (coordinates x, y) where to display the display frame 112.

FIG. 10C illustrates a data example of each of the message queues (MQ) of the guide display transmitter 343 and the guide display receiver 344 of the information processing apparatus 100. The data of each of the message queues of the guide display transmitter 343 and the guide display receiver 344 includes the sequence number in the message storage order and a command in the message of the guide 113 (for example, "display" or "delete" the guide 113).

The data also includes an identifier (ID) of the display frame 112 where to display the guide 113, a transmission time of the command, and the position (coordinates x, y) where to display the guide 113.

Figure 10F:
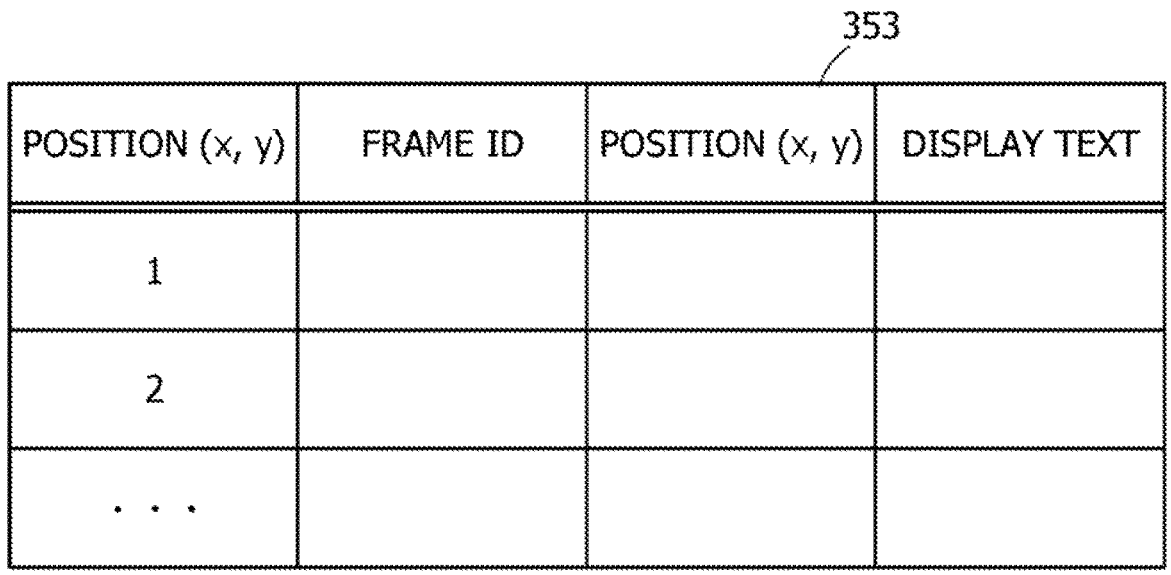
FIG. 10F is a table illustrating an example of data handled by the information processing apparatus according to the embodiment (part 6).

FIGS. 10D to 10F illustrate data examples of tables of the information processing apparatus 100. The information processing apparatus 100 imports data transmitted and received by the message queues (MQ) of the aforementioned receivers and generates the following tables.

FIG. 10D illustrates a data example of the associate candidate table 351 of the information processing apparatus 100. The associate candidate table 351 includes a candidate pair number for each terminal 120 to be associated with the display frame 112, a frame index of the display frame 112 (the number in FIG. 10B), and a terminal index of the terminal 120 (the number in FIG. 10A). The associate candidate table 351 also includes the frame ID of the display frame 112 (the frame ID in FIG. 10B), the terminal ID of the terminal 120 (the terminal ID in FIG. 10A), and the position of the display frame 112 (the position in FIG. 10B).

In the case of the processing example 1 or 2, the associate candidate table 351 includes a timer period T (timer time). In the case of the processing example 3 or 4, the associate candidate table 351 includes the association probability p(i, j).

FIG. 1E illustrates a data example of the link pair table 352 of the information processing apparatus 100. The link pair table 352 includes a pair number of each pair of a terminal 120 and a display frame 112 to be linked with each other, the terminal ID of the terminal 120, and the position (coordinates x, y) of the display frame 112.

FIG. 10F illustrates a data example of the guide window management table 353 of the information processing apparatus 100. The guide window management table 353 includes a window number for each guide 113, the frame ID of the display frame 112 where to display the guide 113, the position (coordinates x and y) of the guide 113, and a message (display text) to be displayed as the guide 113.

(Processing Examples of System)

Next, description will be given of processing examples of the terminal 120, the spatial UI unit device 301, and the information processing apparatus 100 for associating a display frame 112 with a terminal 120.

Figure 11:
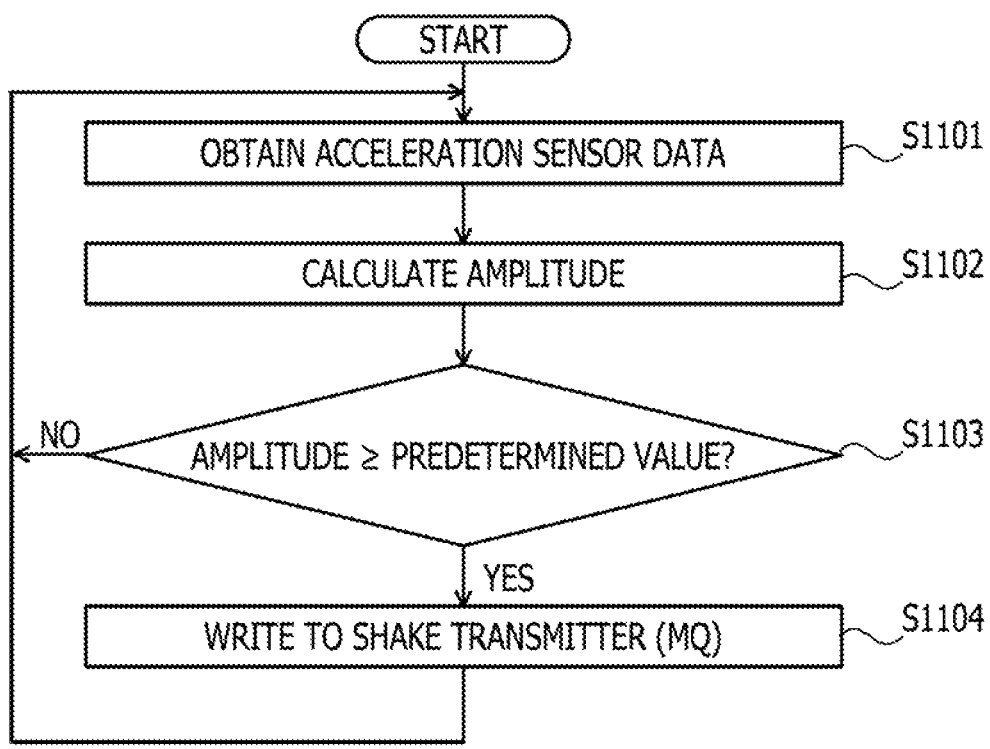
FIG. 11 is a flowchart illustrating a processing example of the terminal.

FIG. 11 is a flowchart illustrating a processing example of the terminal. FIG. 11 mainly illustrates processing executed when the user shakes the terminal 120. The control unit (CPU) of the terminal 120 obtains sensor data of the acceleration sensor 321 (step S1101) and calculates an amplitude (step S1102). The control unit judges whether the amplitude is equal to or larger than a predetermined value (step S1103).

If the amplitude is equal to or larger than the predetermined value (step S1103: Yes), the control unit writes the pieces of information on the shake operation (see FIG. 10A, the screen sharing request) to the shake transmitter (MQ) 323 (step S1104), and returns to the processing at step S1101. On the other hand, if the amplitude is smaller than the predetermined value (step S1103: No), the control unit returns to the processing at step S1101.

Figure 12:
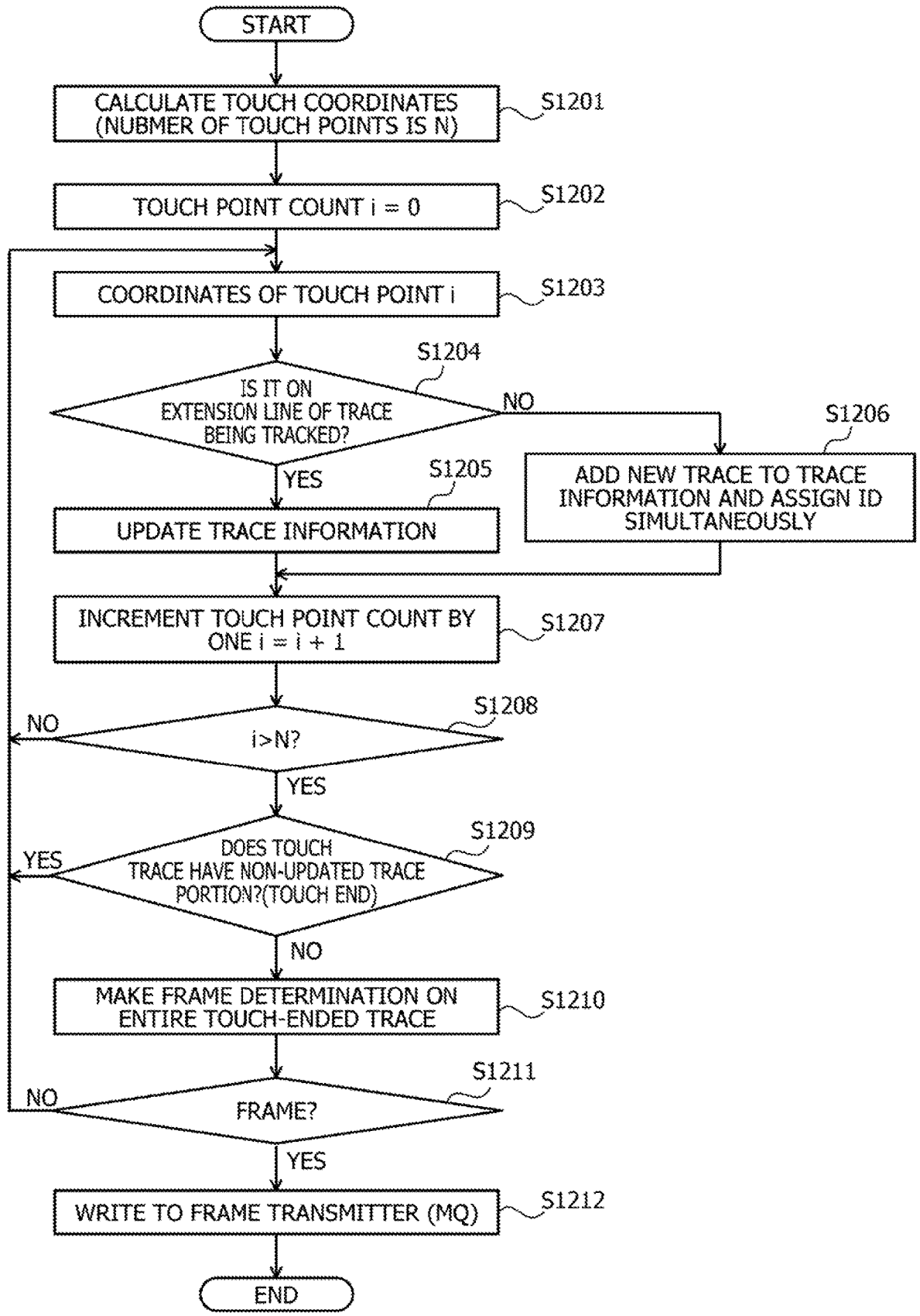
FIG. 12 is a flowchart illustrating an example of display frame detection processing performed by the spatial UI unit device.

FIG. 12 is a flowchart illustrating an example of display frame detection processing performed by the spatial UI unit device. FIG. 12 illustrates the frame detection processing of the display frame 112 by the frame detector 311 of the spatial UI unit device 301. The control unit (CPU) of the spatial UI unit device 301 calculates the coordinates of the touch position where the user operates the touch pen 201 or the like on the display 110 (step S1201). At this time, the touch pen 201 draws a continuous line segment (trace) on the display 110 with one touch of the display 110. Accordingly, N is set as the number of touch points for each touch coordinate calculation.

Next, the control unit sets a touch point count i=0 (initial value) (step S1202), and detects the coordinates of the touch point i (step S1203). The control unit judges whether the coordinates of the detected touch point i are on an extension line of the trace being tracked (step S1204). If the coordinates of the touch point i are on the extension line of the trace being tracked (step S1204: Yes), the control unit proceeds to processing in step S1205. If the coordinates of the touch point i are off the extension line of the trace being tracked (step S1204: No), the control unit proceeds to processing in step S1206.

In step S1205, the control unit updates trace information (step S1205), and proceeds to processing in step S1207. On the other hand, in step S1206, the control unit adds a new trace to the trace information, assigns a new ID (step S1206), and proceeds to processing in step S1207. In step S1207, the control unit increments the touch point count i by 1 (i=i+1) (step 1207).

Next, the control unit judges whether the touch point count i>N (step S1208), If the touch point count i>N (step S1208: Yes), the control unit proceeds to processing in step S1209. If the touch point count i≤N (step S1208: No), the control unit returns to the processing in step S1203.

In step S1209, the control unit judges whether the touch trace still has a non-updated trace portion (step S1209). When the touch trace does not have a non-updated trace portion (step S1209: No), the control unit judges the touch to be ended, and proceeds to processing in step S1210. When the touch trace still has a non-updated trace portion (step S1209: Yes), the control unit returns to the processing in step S1203.

In step S1210, the control unit performs frame determination on the entire touch-ended trace (step S1210). In this frame determination, for example, when the touch-ended trace is closed in a substantially quadrangular or similar shape, the control unit determines that the trace is a frame (step S1211: Yes), and proceeds to processing in step S1212. On the other hand, if the touch-ended trace is not closed in a substantially rectangular or similar shape but remains linear, the control unit determines that the touch-ended trace is not a frame (step S1211: No), and returns to the processing in step S1203.

In step S1212, the control unit judges that the touch-ended trace determined as the frame is the display frame 112, writes the information on the display frame 112 (see FIG. 10B) into the frame transmitter (MQ) 312 (step S1212), and ends the processing up to here.

Figure 13A:
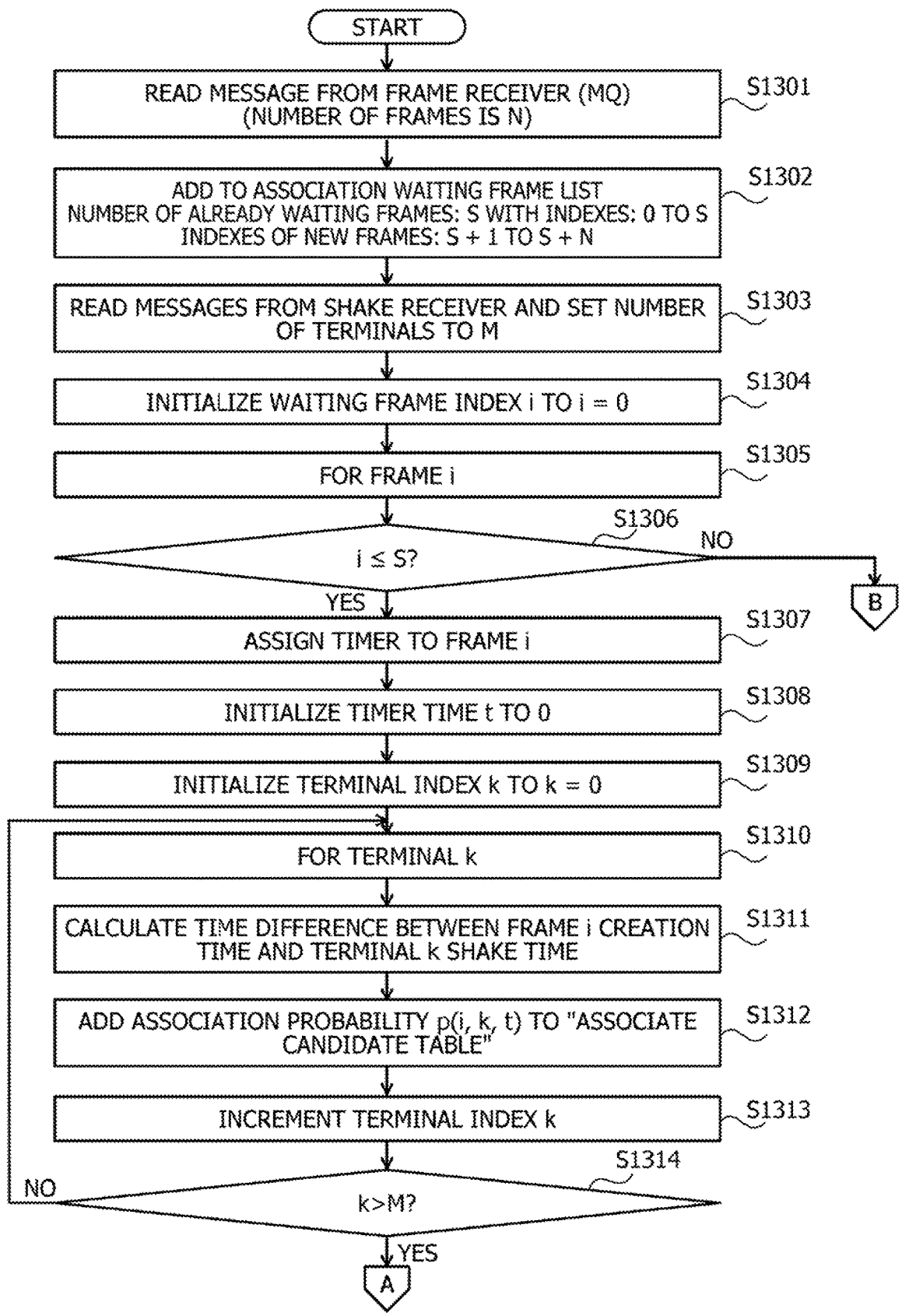
FIG. 13A is a flowchart illustrating an example of associate candidate creation processing executed by the information processing apparatus according to the embodiment (part 1).
Figure 13B:
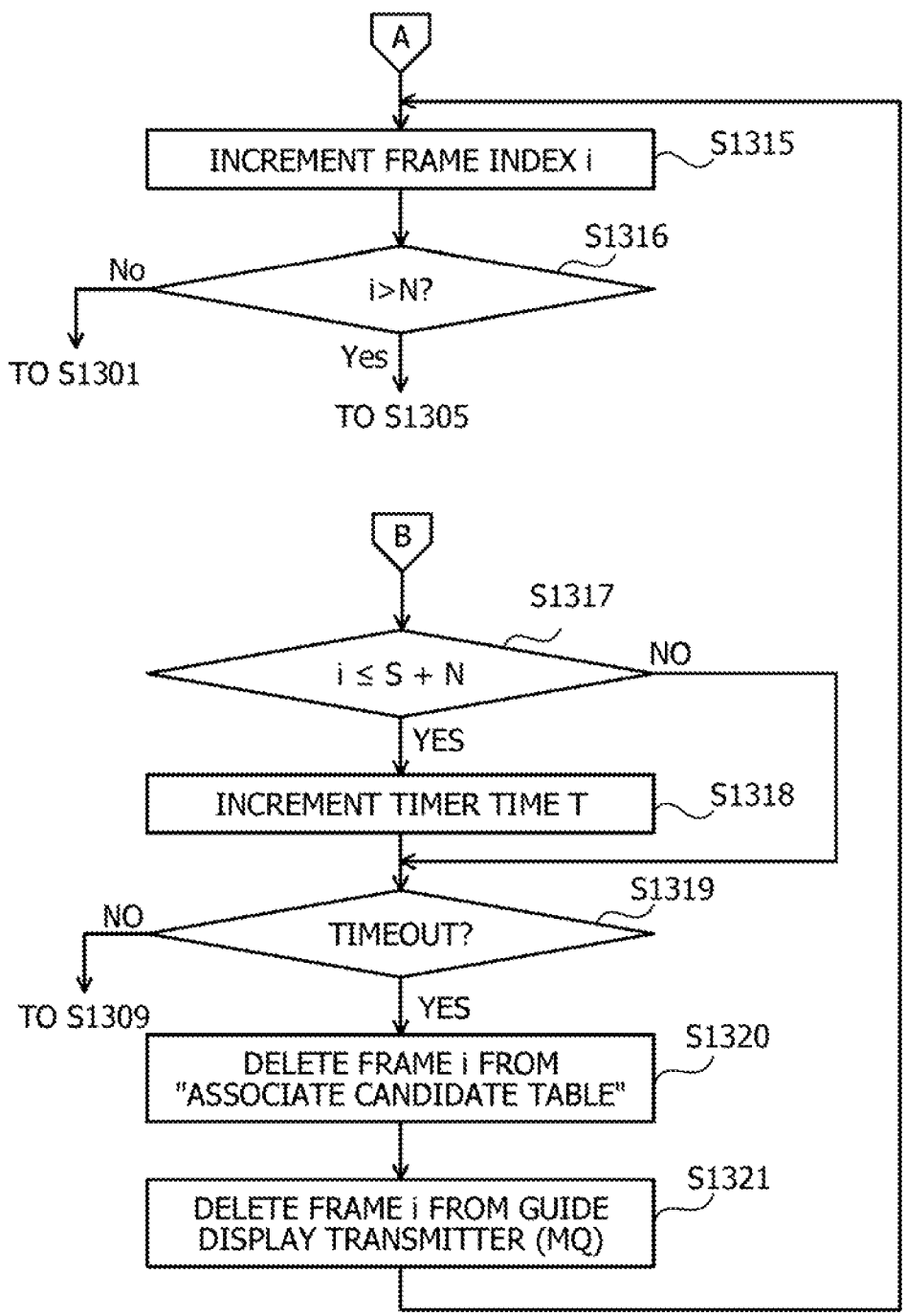
FIG. 13B is the flowchart illustrating the example of the associate candidate creation processing executed by the information processing apparatus according to the embodiment (part 2).

FIGS. 13A and 13B are a flowchart illustrating an example of associate candidate creation processing executed by the information processing apparatus according to the embodiment. A processing example performed by the control unit 330 (associate candidate creation section 331) of the information processing apparatus 100 will be described. The control unit receives information on the display frames 112 from the spatial UI unit device 301, receives the information on shake operations (screen sharing requests) from the terminals 120, creates information of a candidate for a terminal 120 to be associated with each display frame 112, and stores the information in the associate candidate table 351. In this processing example, the processing example 4 using the association probability will be described.

First, the control unit reads messages for the display frames 112 transmitted from the frame receiver 342 by the spatial UI unit device 301 (step S1301). Here, the control unit figures out N as the number of the frames.

Next, the control unit adds the received messages to an association waiting frame list (step S1302). Since there are S already waiting frames with indexes set to 0 to S, the control unit sets S+1 to S+N as the indexes of the new frames.

Next, the control unit reads, from the shake receiver 341, the messages related to the shake operations (screen sharing requests) transmitted by the terminals 120 (step S1303), Here, the control unit figures out M as the number of the terminals 120.

Next, the control unit initializes a waiting frame index i to an initial value (i=0) (step S1304). The control unit performs processing concerning the timer period T for the frame i (step S1305). First, the control unit judges whether the frame i≤S (step S1306). If the frame i≤S (step S1306: Yes), the control unit proceeds to processing in step S1307. If the frame i>S (step S1306: No), the control unit proceeds to processing in step S1317.

In step S1307, the control unit assigns a timer (timer period T) to the frame i (step S1307), and initializes a timer time t to 0 (step S1308). Next, the control unit initializes a terminal index k to an initial value (k=0) (step S1309). The control unit performs processing for associating the terminal k with the display frame 112 (step S1310). First, the control unit calculates the time difference between the creation time of the frame i of the message received for the display frame 112 and the time of the shake operation (screen sharing request) of the message received for the terminal 120 (step S1311).

Next, the control unit calculates the association probability p(i, k, t) and adds the association probability p(i, k, t) to the associate candidate table 351 (step S1312). The control unit increments the terminal index k (step S1313), and judges whether k>M (step S1314). If k>M (step S1314: Yes), the control unit proceeds to processing in step S1315. If k f M (step 1314: No), the control unit returns to the processing in step S1310.

Next, the control unit increments the frame index i (step S1315). The control unit judges whether i>N (step S1316). If i>N (step S1316: Yes), the control unit proceeds to processing in step S1305. If i N (step S1316: No), the control unit returns to the processing in step S1301.

In step S1317, the control unit judges whether i≤S+N (step S1317). If i≤S+N (step S1317: Yes), the control unit proceeds to processing in step S1318. If i>S+N (step S1317: No), the control unit proceeds to processing in step S1319.

In step S1318, the control unit increments the timer time t (step S1318). In step S1319, the control unit judges whether a timeout occurs in the timer period T (step S1319). If the timeout occurs (step S1319: Yes), the control unit proceeds to processing in step S1320. If the timeout does not occur yet (step S1319: No), the control unit returns to the processing in step S1309.

In step S1320, the control unit deletes the frame i from the associate candidate table 351 (step S1320), deletes the message for the frame i from the guide display transmitter 343 (step S1321), and returns to the processing in step S1315.

Figure 14A:
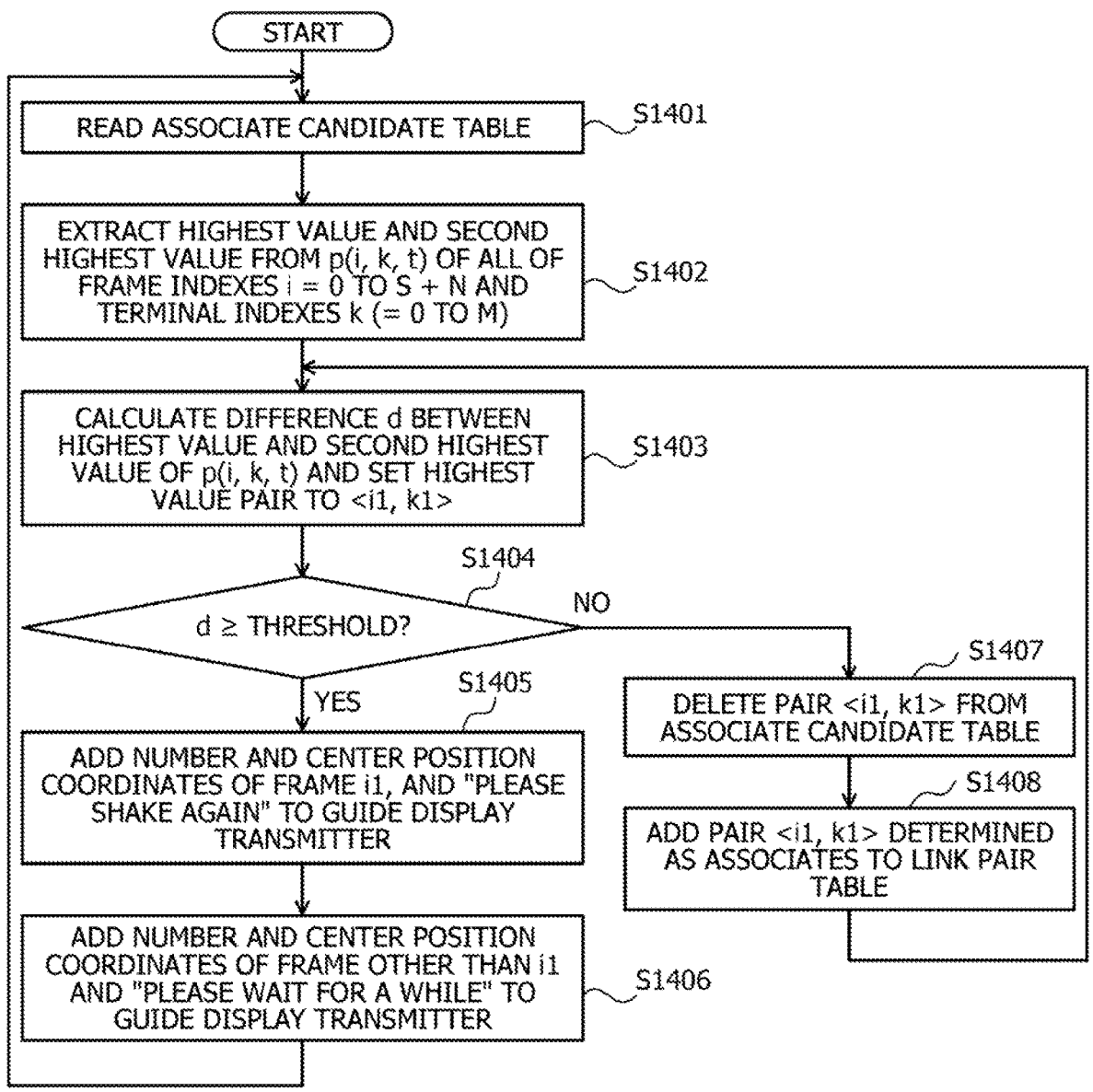
FIG. 14A is a flowchart illustrating an example of association determination creation processing executed by the information processing apparatus according to the embodiment.

FIG. 14A is a flowchart illustrating an example of association determination creation processing performed by the information processing apparatus according to the embodiment, and FIG. 14B is a table illustrating an example of association probabilities that the information processing apparatus according to the embodiment refers to when determining an association. In this processing example, the control unit 330 (association determination section 332) of the information processing apparatus 100 determines the terminal 120 to be associated with the display frame 112 based on association probability information stored as a part of the associate candidate table 351, and stores the determined terminal 120 into the link pair table 352.

The association probability p(i, k, t) illustrated in FIG. 14B is a table 1400 including multiple terminals 120 on the vertical axis and multiple display frames 112 on the horizontal axis, and includes parameters of a frame index i of the display frame 112, a terminal index k of the terminal 120, and a timer time t of the timer period T.

As illustrated in FIG. 14A, the control unit first reads the associate candidate table 351 (step S1401). Next, the control unit extracts the highest value and the second highest value from the association probabilities p(i, k, t) of all the pairs of the frame indexes i (=0 to S+N) and the terminal indexes k (0 to M) (step S1402).

Figure 15:
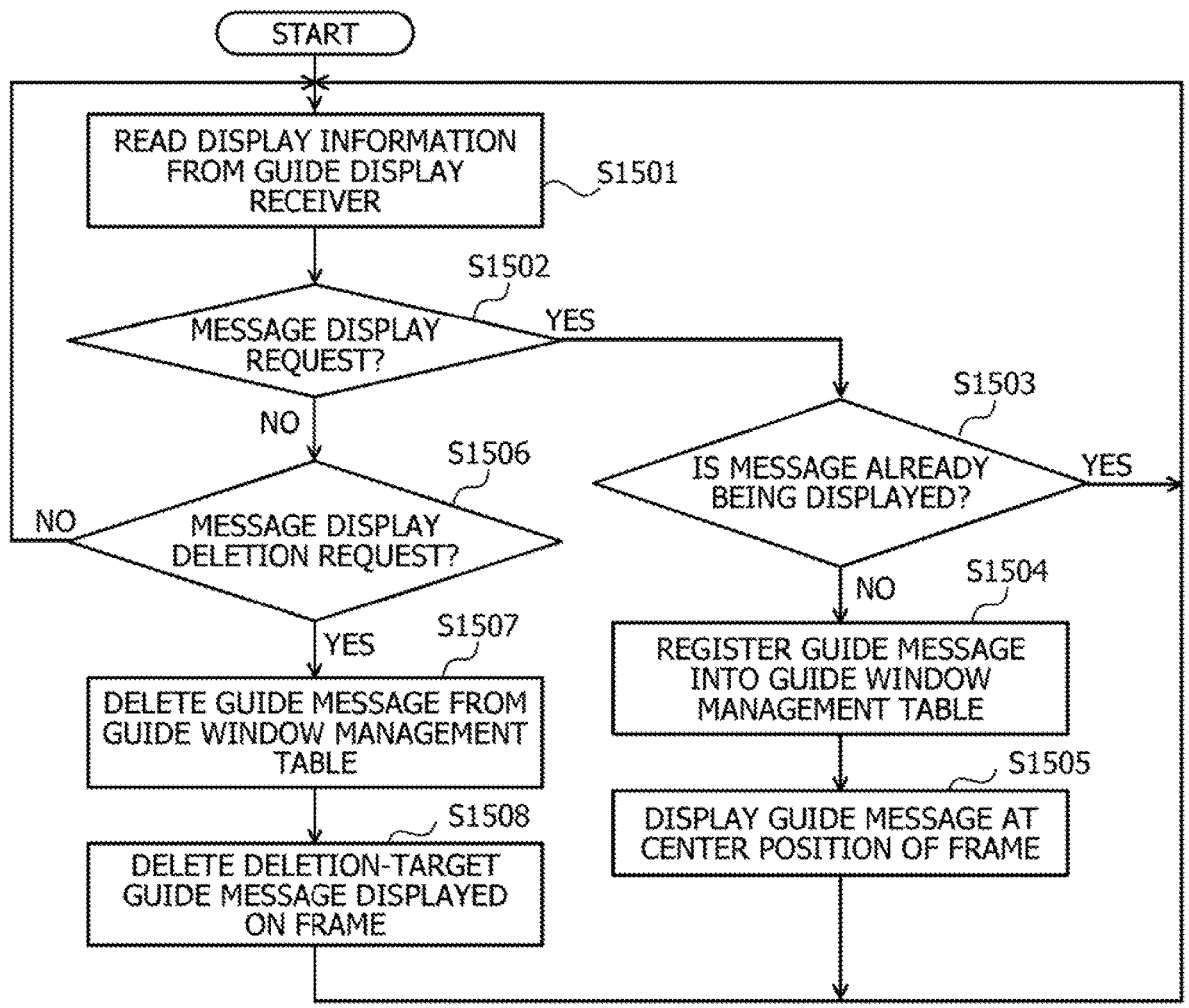
FIG. 15 is a flowchart illustrating an example of guide message display processing performed by the information processing apparatus according to the embodiment.

Next, the control unit calculates the difference d between the highest value and the second highest value of the association probabilities p(i, k, t), and sets the highest value pair (the pair of the display frame 112 and the terminal 120) to <i1, k1> (step S1403, see FIG. 15).

Subsequently, the control unit judges whether the difference d is equal to or larger than a certain threshold (step S1404). If the difference d is equal to or larger than the certain threshold (step S1404: Yes), the control unit proceeds to processing in step S1405. If the difference d is smaller than the certain threshold (step S1404: No), the control unit proceeds to processing in step S1407.

In step S1405, the control unit adds, to the guide display transmitter 343, a message "Please shake again" as the guide 113 at the center position coordinates for the display frame 112 with the frame number of the frame i1 (step S1405). The control unit adds, to the guide display transmitter 343, a message "Please wait for a while" as the guide 113 at the center position coordinates for the display frame 112 with the frame number other than the frame i1 (step S1406), and returns to the processing in step S1401.

In step S1407, the control unit deletes the pair <i1, k1> from the associate candidate table 351 (step S1407), adds the pair <i1, k1> determined to be associated to the link pair table 352 (step S1408), and returns to the processing in step S1403.

FIG. 15 is a flowchart illustrating an example of guide message display processing performed by the information processing apparatus according to the embodiment. A processing example performed by the control unit 330 (guide message display section 333) of the information processing apparatus 100 will be described.

First, the control unit reads information for display of the guide 113 (see FIG. 10C) from the guide display receiver 344 (step S1501), and judges whether the information is a request to display the message (the command is "display") (step S1502). If it is a request to display the message (the command is "display") (step S1502: Yes), the control unit proceeds to processing in step S1503. On the other hand, if it is not a request to display the message (the command is "delete", step S1502: No), the control unit proceeds to processing in step S1506.

In step S1503, the control unit refers to the guide window management table 353 and judges whether the message of the guide 113 is already being displayed (step S1503). If the message of the guide 113 is already being displayed (step S1503: Yes), the control unit returns to the processing in step S1501. On the other hand, if the message of the guide 113 is not displayed yet (step S1503: No), the control unit registers the message of the guide 113 into the guide window management table 353 (step S1504).

Next, the control unit displays the message of the guide 113 at the center position of the display frame 112 (step S1505), and returns to the processing in step S1501.

In step S1506, the control unit judges whether or not the information is a request to delete the message of the guide 113 (the command is "delete") (step S1506). If it is a request to delete the message (step S1506: Yes), the control unit proceeds to processing in step S1507. On the other hand, if it is not a request to delete the message (step 1506: No), the control unit returns to the processing in step S1501.

In step S1507, the control unit refers to the guide window management table 353 and deletes the message of the concerned guide 113 from the guide window management table 353 (step S1507). The control unit deletes (hides) the deletion target message of the guide 113 displayed on the display frame 112 (step S1508), and returns to the processing in step S1501.

Figure 16:
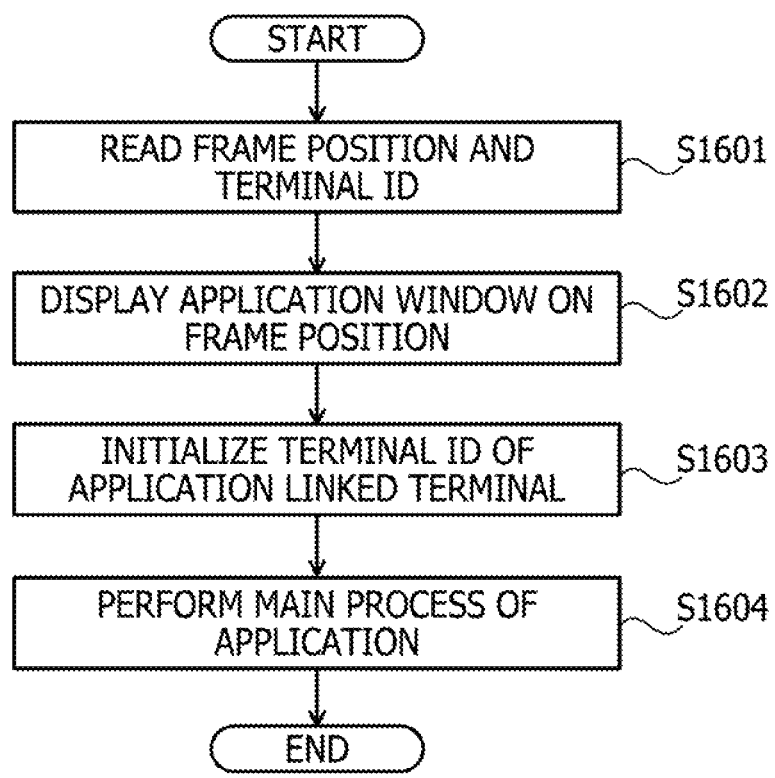
FIG. 16 is a flowchart illustrating a processing example of a spatial UT unit device.

FIG. 16 is a flowchart illustrating a processing example of the spatial UI unit device. FIG. 16 mainly illustrates a processing example of display on the display 110 by the spatial UI section 313 of the spatial UI unit device 301.

First, the spatial UI section 313 reads the frame position (coordinates) of the display frame 112 and the terminal ID of the terminal 120 (step S1601). Next, the spatial UI section 313 displays an application window on the frame position (coordinates) of the display frame 112 (step S1602). The application window is a window for displaying an operation target object (the screen of the terminal 120) in the display frame 112 on the display 110.

Next, the spatial UI section 313 initializes the terminal ID of the terminal 120 as an application linked terminal (step S1603), executes a main process of the application (step S1604), and ends the processing up to here. As a result of execution of the main process of the application, the operation target object (the screen of the terminal 120) is displayed in the display frame 112 on the display 110, and the screen of the terminal 120 is enabled to be shared by multiple users.

(Specific Example of Associating Multiple Terminals with Multiple Display Frames)

FIGS. 17 to 28 are diagrams illustrating a specific example of associating multiple terminals with multiple display frames by the information processing apparatus according to the embodiment. The processing example 4 (implementation example) described in FIG. 9 will be described more specifically using state transition.

Figure 17:
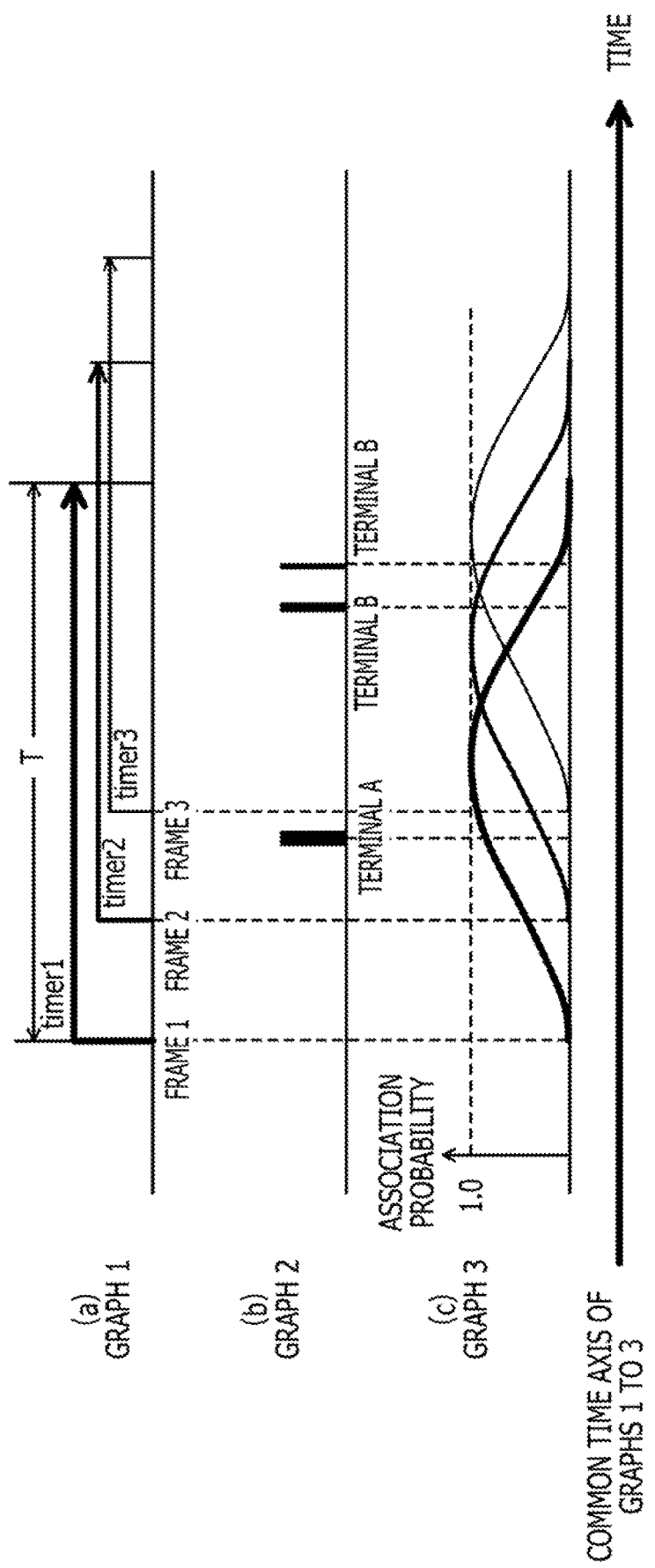
FIG. 17 is a diagram illustrating a specific example of associating multiple terminals with multiple display frames by the information processing apparatus according to the embodiment (part 1).

Detailed description will be given of processing in which, in a case where the information processing apparatus 100 detects events where multiple display frames 112 are drawn and events where multiple terminals 120 are shaken, the information processing apparatus 100 associates each of the display frames 112 with one of the terminals 120. In the following example, as illustrated in FIG. 17, there are three display frames 112, namely, frames 1 to 3 and there are two terminals 120, namely, terminals A and B.

Each of FIGS. 17 to 28 illustrates three graphs of (a) graph 1 "frame event detection time and shake event waiting timer", (b) graph 2 "shake event detection time of terminal 120", and (c) graph 3 "association probability between display frame and shaken terminal 120". These three graphs (a) to (c) are arranged on a common time axis. As illustrated in (a), the timer length (timer) of the shake event waiting timer for the terminal 120 is T.

Figure 18:
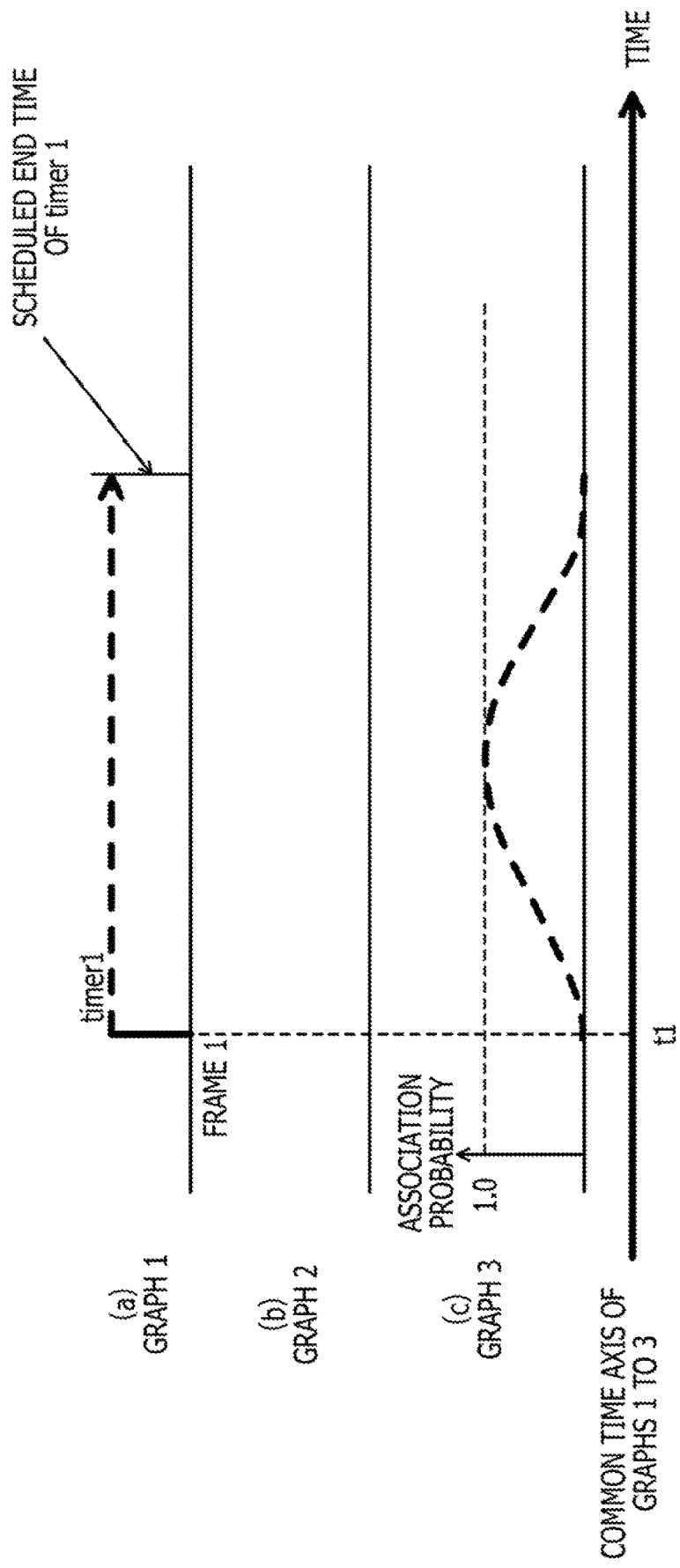
FIG. 18 is a diagram illustrating the specific example of associating the multiple terminals with the multiple display frames by the information processing apparatus according to the embodiment (part 2).

First, as illustrated in FIG. 18, an event where the frame 1 of the display frame 112 is drawn at time t1 is detected. In this case, as illustrated in FIG. 18(a), the information processing apparatus 100 activates a timer 1 for the frame 1 at time t. Here, as illustrated in FIG. 18(c), the association probability has a certain curve (for example, a normal distribution) within a time period from time t1 to the scheduled end time of the timer 1.

Figure 19:
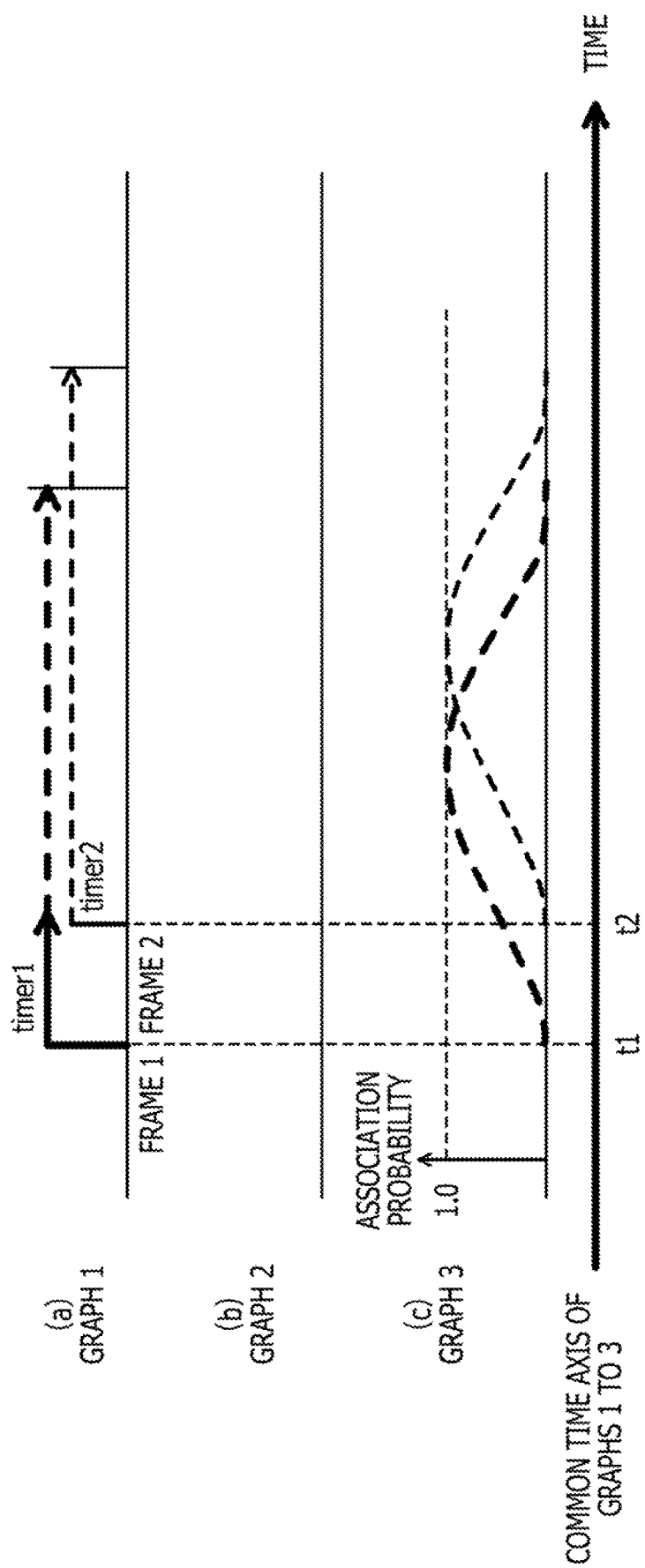
FIG. 19 is a diagram illustrating the specific example of associating the multiple terminals with the multiple display frames by the information processing apparatus according to the embodiment (part 3).

Next, as illustrated in FIG. 19, an event where the frame 2 of the display frame 112 is drawn is detected at time t2. In this case, as illustrated in FIG. 19(a), the information processing apparatus 100 activates a timer 2 for the frame 2 at time t2. Here, as illustrated in FIG. 19(c), the association probability has a certain curve similar to that of the frame 1 within a time period from time t2 to the scheduled end time of the timer 2.

Figure 20:
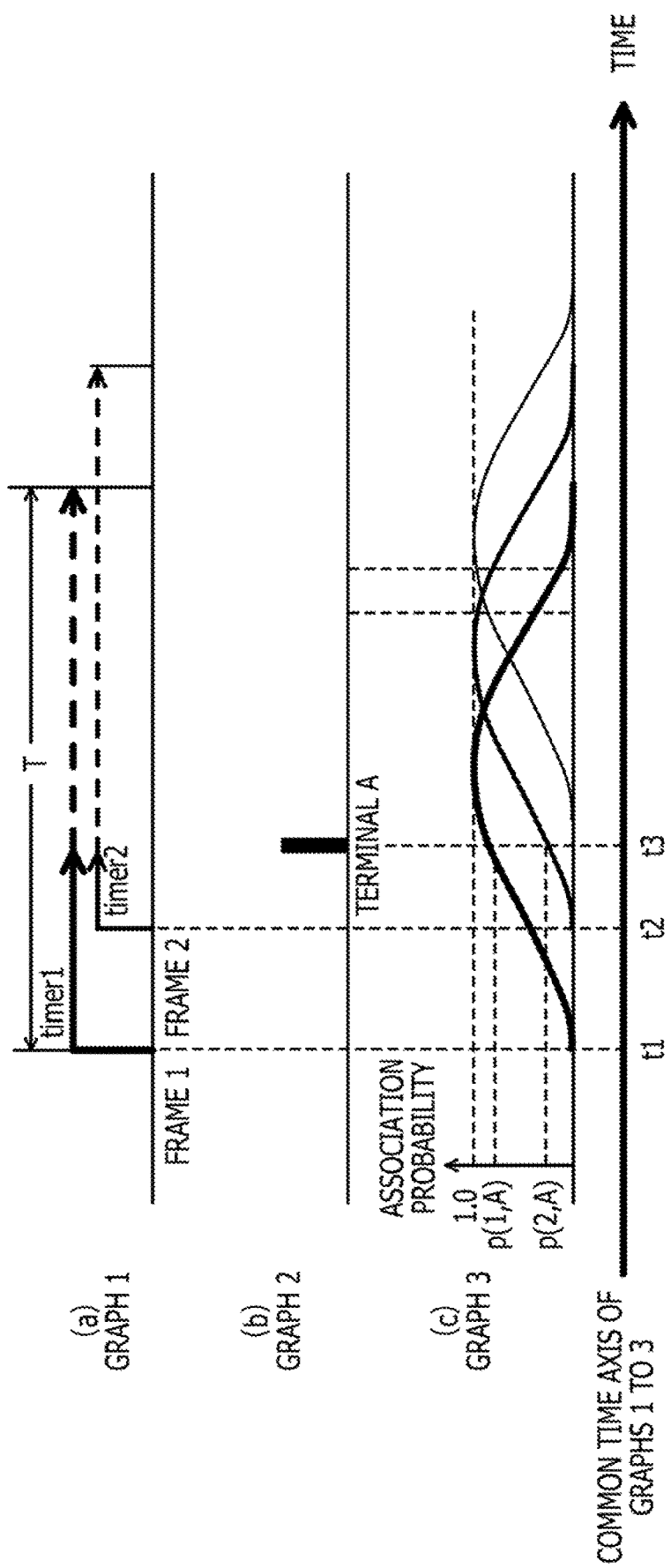
FIG. 20 is a diagram illustrating the specific example of associating the multiple terminals with the multiple display frames by the information processing apparatus according to the embodiment (part 4).
Figure 21:
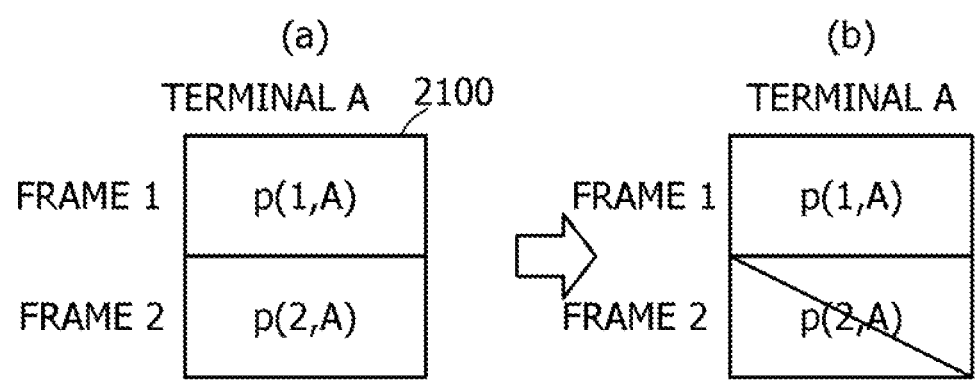
FIG. 21 is a diagram illustrating the specific example of associating the multiple terminals with the multiple display frames by the information processing apparatus according to the embodiment (part 5).

Next, as illustrated in FIG. 20, a shake event of the terminal A is detected at time t3. In this case, the information processing apparatus 100 obtains the association probability p(1, A) of the frame 1 with the terminal A and the association probability p(2, A) of the frame 2 with the terminal A from the graph of the association probabilities illustrated in FIG. 20(c), and creates an association probability table 2100 illustrated in FIG. 21. Initially, as the table 2100 illustrated in FIG. 21(a), a table is created in which the vertical axis represents the display frames 112 (the frames 1 and 2) and the horizontal axis represents the terminal 120 (terminal A).

When p(1, A)–p(2, A)>H (H is a threshold), the information processing apparatus 100 associates the frame 1 with the terminal A. In this case, the information on the terminal A and the frame 2 is deleted as illustrated in FIG. 21(b).

Figure 22:
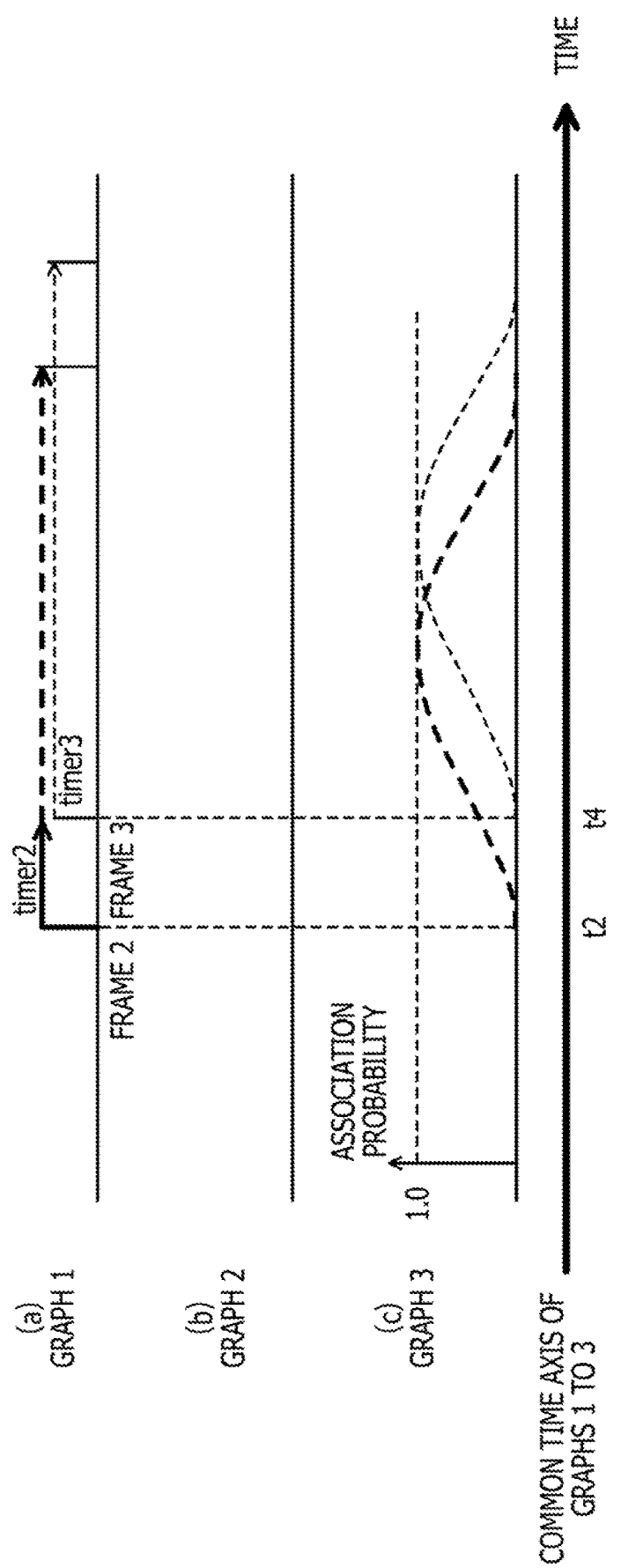
FIG. 22 is a diagram illustrating the specific example of associating the multiple terminals with the multiple display frames by the information processing apparatus according to the embodiment (part 6).

Next, as illustrated in FIG. 22, an event where a frame 3 is drawn is detected at time t4. In this case, as illustrated in FIG. 22(a), the information processing apparatus 100 activates a timer 3 for the frame 3 at time t3. Here, as illustrated in FIG. 22(c), the association probability has a certain curve (for example, a normal distribution) within a time period from time 3 to the scheduled end time of the timer 3.

Figure 23:
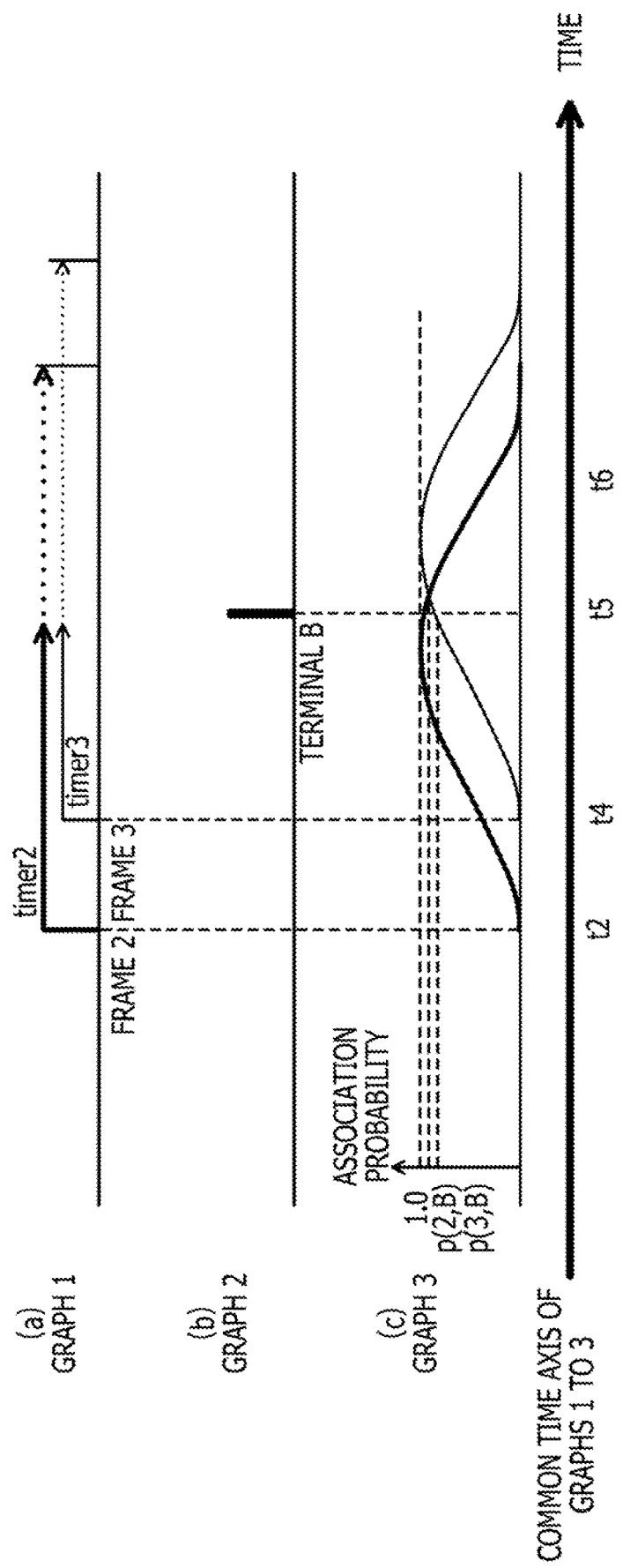
FIG. 23 is a diagram illustrating the specific example of associating the multiple terminals with the multiple display frames by the information processing apparatus according to the embodiment (part 7).
Figure 24:
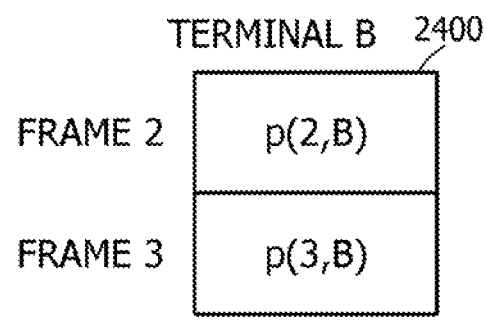
FIG. 24 is a diagram illustrating the specific example of associating the multiple terminals with the multiple display frames by the information processing apparatus according to the embodiment (part 8).
Figure 25:
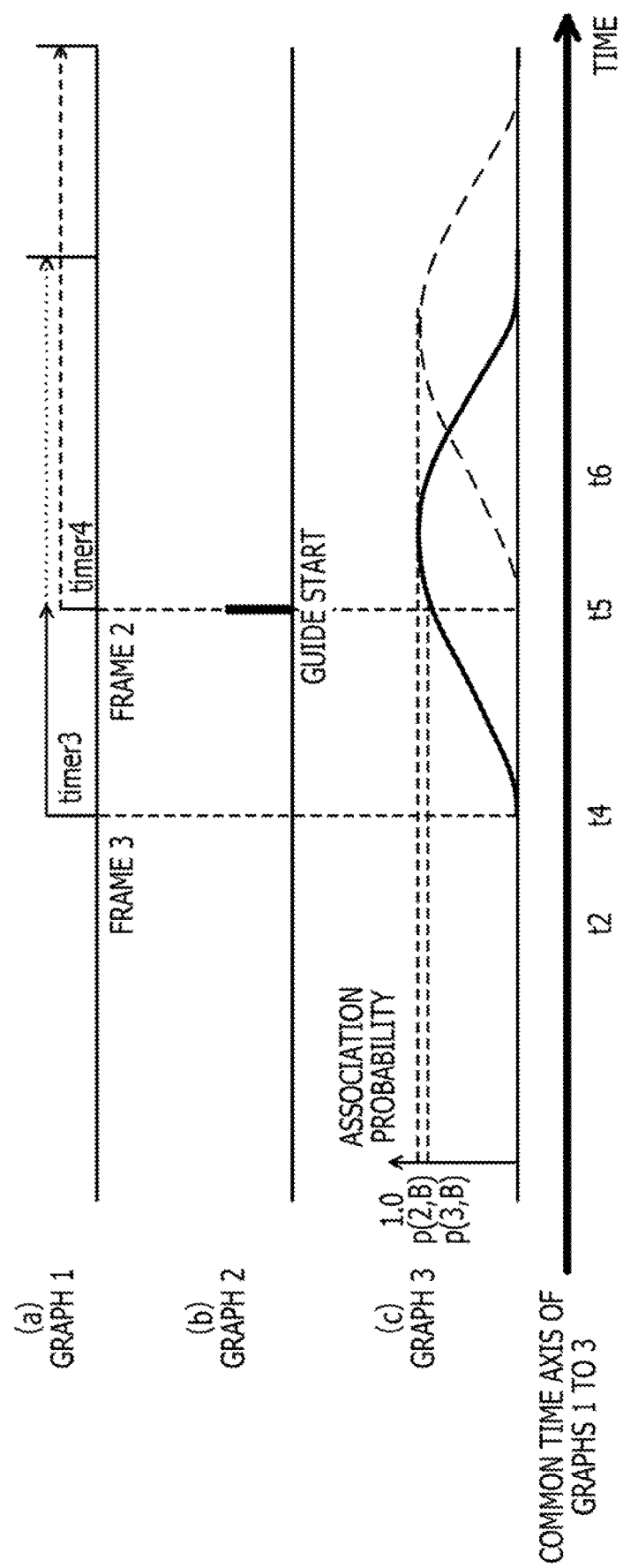
FIG. 25 is a diagram illustrating the specific example of associating the multiple terminals with the multiple display frames by the information processing apparatus according to the embodiment (part 9).

Next, as illustrated in FIG. 23, a shake event of the terminal B is detected at time t5. In this case, the information processing apparatus 100 obtains the association probability p(2, B) of the frame 2 with the terminal B and the association probability p(3, B) of the frame 3 with the terminal B from the graph of the assembly probabilities illustrated in FIG. 23(c), and creates a table 2400 of the assembly probabilities illustrated in FIG. 24.

As illustrated in FIG. 23(c), the association probabilities of the frame 2 and the frame 3 with the terminal B at time t5 are close to each other. For example, when p(2, B)–p(3, B)<H (H is the threshold), which of the frames 2 and 3 the terminal B is to be associated with is unclear (it is not possible to determine the association).

In this case, as illustrated in FIG. 25(b), the information processing apparatus 100 displays a message "Please shake again" as the guide 113 at the display position of the frame 2. The information processing apparatus 100 also displays A message "Please wait for a while" as the guide 113 at the display position of the frame 3.

As illustrated in FIG. 25(a), immediately after displaying "Please shake again" as the guide 113 in the frame 2, the information processing apparatus 100 cancels the old timer 2 and activates a new timer 4.

Figure 26:
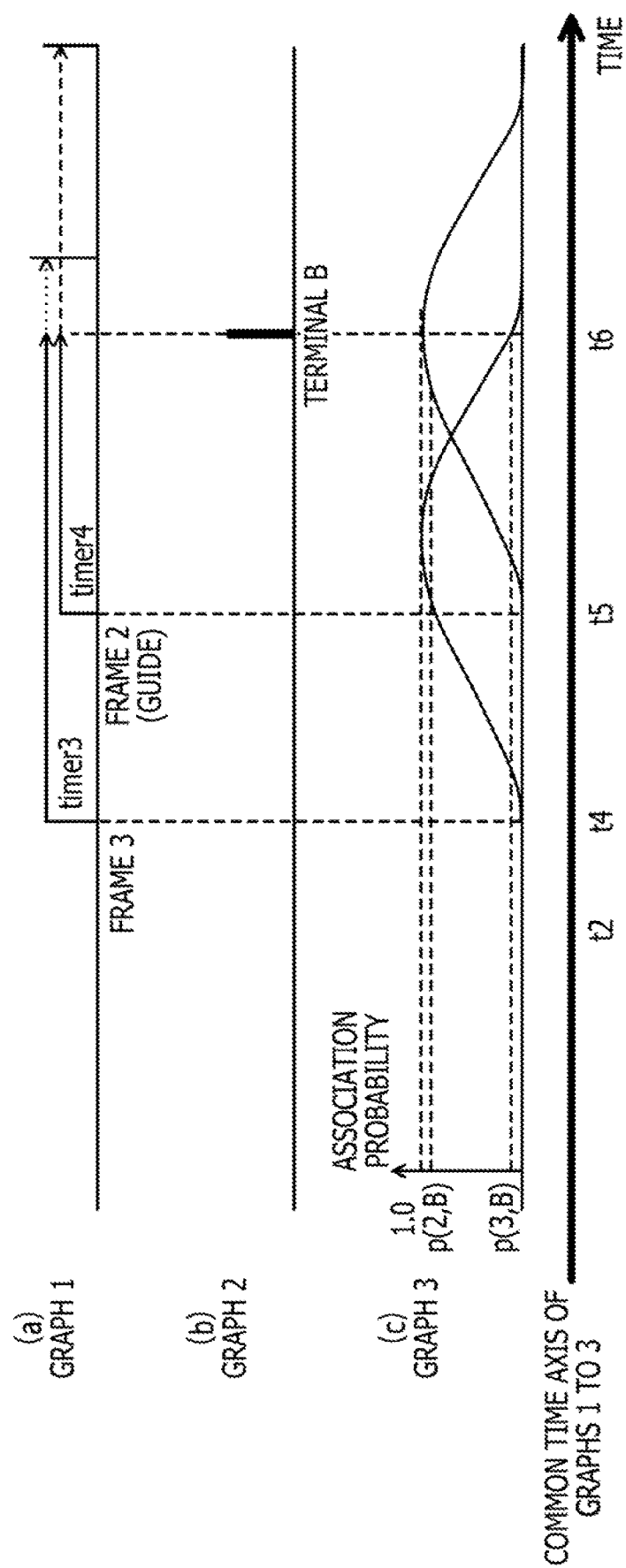
FIG. 26 is a diagram illustrating the specific example of associating the multiple terminals with the multiple display frames by the information processing apparatus according to the embodiment (part 10).
Figure 27:
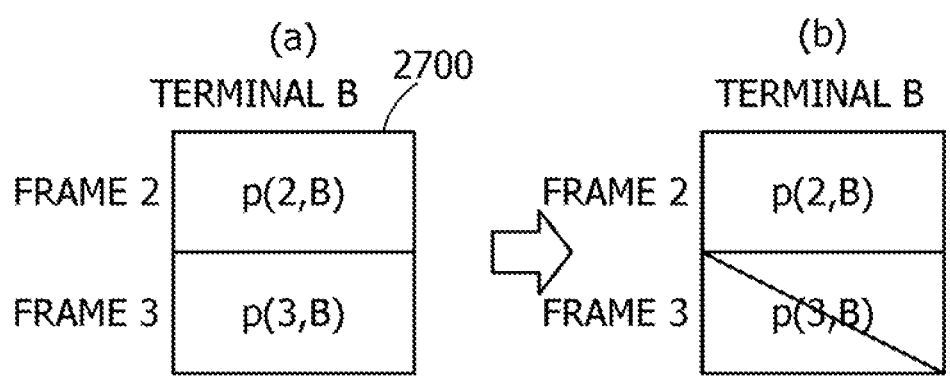
FIG. 27 is a diagram illustrating the specific example of associating the multiple terminals with the multiple display frames by the information processing apparatus according to the embodiment (part 11).

Thereafter, as illustrated in FIG. 26, a shake event of the terminal B is detected at time t6. In this case, the information processing apparatus 100 obtains the association probability p(2, B) of the frame 2 with the terminal B and the association probability p(3, B) of the frame 3 with the terminal B from the graph of the association probabilities illustrated in FIG. 26(c), and creates a table 2700 of the assembly probabilities illustrated in FIG. 27(a).

As illustrated in FIG. 26(c), p(2, B)–p(3, B)>H (H is the threshold) holds. Accordingly, the information processing apparatus 100 associates the frame 2 with the terminal B. In this case, the information on the terminal B and the frame 3 is deleted as illustrated in FIG. 27(b).

Figure 28:
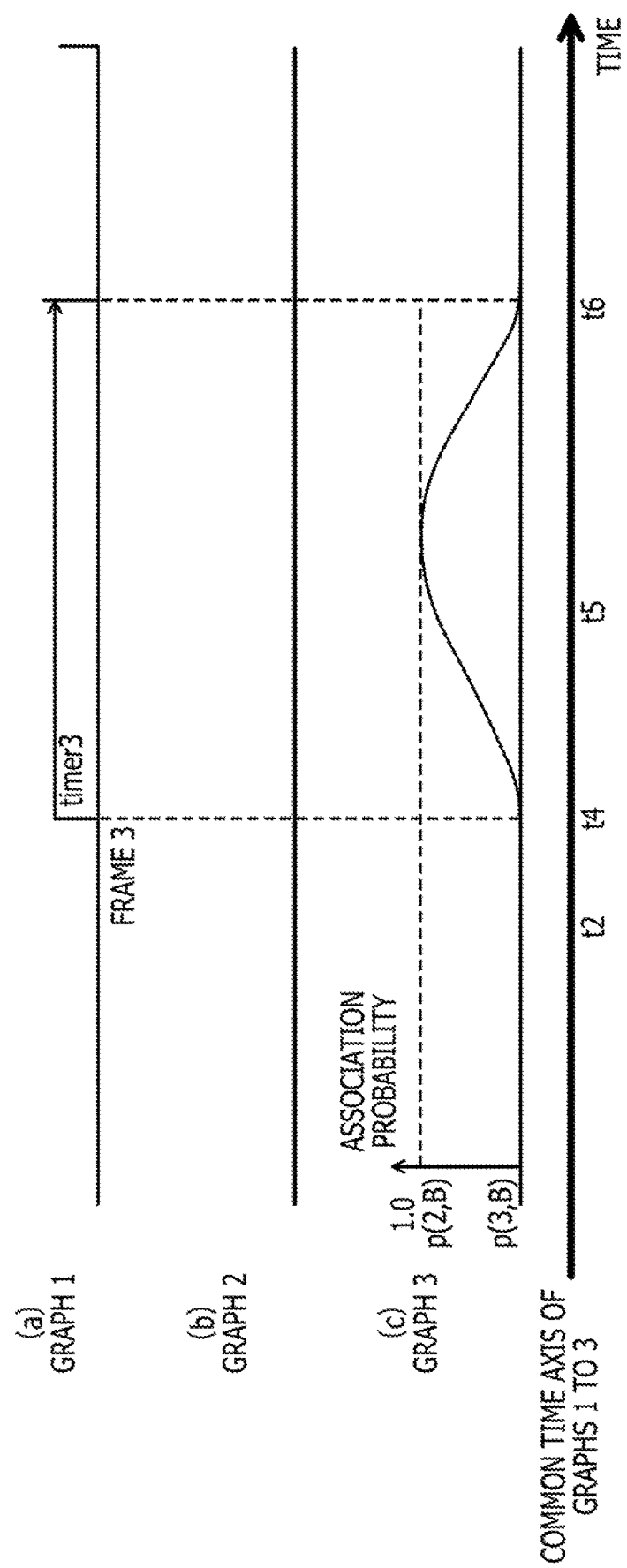
FIG. 28 is a diagram illustrating the specific example of associating the multiple terminals with the multiple display frames by the information processing apparatus according to the embodiment (part 12).

Thereafter, no new shake event is detected until the timer 3 ends, as illustrated in FIG. 28. In this case, the information processing apparatus 100 automatically causes the frame 3 to disappear (display deletion).

(Problems of the Related Art)

FIG. 29 is a diagram illustrating problems concerning the linking of a display frame with a terminal according to the related art. In a case where two or more shake events are detected within a predetermined period of time after a user specifies a link position for a terminal on a spatial UI screen (display), the related art has a problem of failing to determine the terminal to be linked.

For example, as in the example illustrated in FIG. 29(a), 1. frames 1 and 2 are drawn substantially simultaneously on two displays 1 and 2. 2. multiple terminals A and B are shaken substantially simultaneously. In this case, 3. it is not possible to determine which of the terminals A and B is to be associated with the frame 1. It is not possible to determine which of the terminals A and B is to be associated with the frame 2.

In another example illustrated in FIG. 29(b), 1. a frame is drawn on a display 1. Thereafter, 2. in a case where, while a terminal A is being shaken, a shake operation of a terminal B other than the terminal A is also detected, 3. it is not possible to determine which of the terminals A and B is to be associated with the frame 1. For example, there is a case where the terminal B is not shaken intentionally by the user but the terminal B erroneously detects a shake operation due to the user's walking.

In contrast to this, according to the embodiment, it is possible to display the screen (operation target object) of the terminal 120 of a user in the display frame 112 drawn by the user on the display screen 111 of the display 110 in order for multiple users to carry out collaborative work or the like. As a result, the small screen of the terminal 120 is enabled to be displayed on the large display 110, and the multiple users are enabled to share the screen.

In this processing, in response to a screen sharing request made through the shake operation of the terminal 120, the information processing apparatus 100 associates the operation target object of the terminal 120 with the display frame 112 and displays the operation target object in the display frame 112. When two or more terminals 120 are shaken after a user draws the display frame, the guide 113 is displayed to prompt the user to perform a shake operation again because it is not possible to determine the terminal 120 to be associated with the display frame 112. This makes it possible to avoid a situation where shake operations of multiple terminals bring about a failure in determining the operation target object to be associated with the display frame, and thereby to appropriately associate the screen (operation target object) of the terminal 120 of the requesting user with the display frame 112 and display the screen in the display frame 112.

According to the embodiments described above, a display control apparatus links an operation target object to be displayed on a display unit with the terminal that will output the operation target object. In a case where, after a predetermined display operation for displaying the operation target object on the display unit is detected, specific operations for outputting the operation target objects from multiple terminals are detected within a certain period of time (timer period), a guide giving a prompt to perform a specific operation again is presented.

For example, the operation target object is a display screen of the terminal, the display operation is an operation in which the user draws a display frame for specifying an area where to display the display screen on the display unit, and the specific operation is a shake operation in which the user shakes the terminal. When detecting a shake operation of a terminal within a certain period of time after a display frame is drawn, the information processing apparatus establishes a link through which a display screen output by the terminal will be displayed in the display frame.

Thus, the user is enabled to display the display screen of the terminal on the display unit only by drawing the display frame on the display unit and then shaking the terminal, and multiple users are enabled to share the screen of the terminal via the display unit. In a case where multiple terminals are shaken within a certain period of time after the display frame is drawn on the display unit and it is not possible to determine a link between the terminal and the display frame, a guide giving a prompt to perform a shake operation again is presented, thereby making it possible to determine a link between the terminal and the display frame.

When shake operations of multiple terminals are detected within a certain period of time after multiple display frames are drawn, a guide giving a prompt to perform a shake operation again is displayed in one display frame selected from the multiple display frames. A link with the display screen of the terminal to be displayed in the one display frame may be first established, and a guide indicating the link determination waiting status may be displayed in the other display frame. In this way, even when multiple users perform operations for displaying the screens of the terminals on the display unit at substantially the same time, it is possible to determine the terminal to be linked with each of the display frames one after another without requiring the users to perform complicated operations.

After detecting a predetermined display operation for displaying the operation target object on the display unit, the display control apparatus refers to the pre-stored probability model depending on an elapsed time. Based on the probability at the time when the specific operation for actually outputting the operation target object from the terminal is detected, the terminal having the highest probability is linked with the operation target object. Thus, it is possible to link the display unit and the operation target object (the screen of the terminal) with each other without waiting for the elapse of the certain period of time (timer period).

In a case where multiple specific operations are detected after a predetermined display operation is detected and where a difference between the highest probability and the next highest probability is equal to or larger than a certain threshold, the terminal having the highest probability may be linked with the operation target object. This makes it possible to more accurately perform the processing of linking the display unit with the operation target object using the probability.

Therefore, according to the embodiments, it is possible to display, through a simple operation, an enlarged image of the small screen of a terminal of a user on a large display in order for multiple users to carry out collaborative work or the like. To this end, the user does not have to perform a complicated operation such as mode switching, but is enabled to cause the screen of the terminal to be shared by multiple users through the simple operation.

The display control method described in any of the embodiments of the present invention may be enabled by causing a processor such as a server to execute a program prepared in advance. The display control method is recorded in a computer-readable recording medium such as a hard disk, a flexible disk, a compact disc-read only memory (CD-ROM), a digital versatile disk (DVD), or a flash memory and is executed after being read from the recording medium by the computer. The present display control method may be distributed via a network such as the Internet.

With regard to the embodiments described above, the following appendices are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A display control method comprising:
   determining, by a computer, a link between an operation target object to be displayed on a display and a terminal that is to output the operation target object and is included in a plurality of terminals;
   modeling, for each of a plurality of display frames which are drawn on the display by users of the plurality of terminals, a plurality of probabilities of a corresponding plurality of periods of time between a first time when a user of the terminal starts drawing a display frame on the display and each second time of a plurality of different second times when the user performs a specific operation using the terminal as a probability model;
   when detecting specific operations of outputting the operation target object from the plurality of terminals within a certain period of time after drawing the display frame on the display, specifying, using the probability model in which the plurality of probabilities are modeled for each of the plurality of display frames, a terminal which is associated with a display frame in which a difference between a first probability of a highest value of the plurality of probabilities and a second probability of a second highest value of the plurality of probabilities is equal or larger than a threshold; and
   providing a guide giving a prompt to perform the specific operation again when the difference is smaller than the threshold.

2. The display control method according to claim 1, wherein the drawing the display frame is an operation in which the user draws the display frame specifying an area where to display a display screen on the display, and the specific operation is a shake operation in which the user shakes the terminal.

3. The display control method according to claim 2, wherein when the shake operation by the user of one of the plurality of terminals is detected within the certain period of time after the display frame is drawn, a link is established such that the display screen which is output from the one of the plurality of terminals is displayed in the display frame.

4. The display control method according to claim 3, wherein when a plurality of shake operations from the plurality of terminals are detected within the certain period of time after the plurality of the display frames are drawn, a guide giving a prompt to perform the shake operation again is displayed in one display frame selected from the plurality of display frames, and a link with the display screen of the terminal of the plurality of the terminals and to be displayed on the one display frame is established, and a guide indicating a link determination waiting status is displayed in another display frame.

5. A non-transitory computer-readable recording medium recording a display control program causing a computer to execute a process comprising:
 determining a link between an operation target object to be displayed on a display and a terminal that is to output the operation target object and is included in a plurality of terminals;
 modeling, for each of a plurality of display frames which are drawn on the display by users of the plurality of terminals, a plurality of probabilities of a corresponding plurality of periods of time between a first time when a user of the terminal starts drawing a display frame on the display and each second time of a plurality of different second times when the user performs a specific operation using the terminal as a probability model;
 when detecting specific operations of outputting the operation target object from the plurality of terminals within a certain period of time after drawing the display frame on the display, specifying, using the probability model in which the plurality of probabilities are modeled for each of the plurality of display frames, a terminal which is associated with a display frame in which a difference between the first probability of the highest value of the plurality of probabilities and the second probability of the second highest value of the plurality of probabilities is equal or larger than a threshold; and
 providing a guide giving a prompt to perform the specific operation again when the difference is smaller than the threshold.

* * * * *